US012469561B2

(12) United States Patent
Wang

(10) Patent No.: US 12,469,561 B2
(45) Date of Patent: Nov. 11, 2025

(54) METHOD FOR PROGRAMMING MEMORY DEVICE, MEMORY DEVICE AND MEMORY SYSTEM

(71) Applicant: Yangtze Memory Technologies Co., Ltd., Hubei (CN)

(72) Inventor: Yu Wang, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 104 days.

(21) Appl. No.: 18/188,992

(22) Filed: Mar. 23, 2023

(65) Prior Publication Data

US 2023/0282285 A1    Sep. 7, 2023

Related U.S. Application Data

(63) Continuation of application No. PCT/CN2023/078444, filed on Feb. 27, 2023.

(30) Foreign Application Priority Data

Mar. 3, 2022 (CN) .......................... 202210203975.9

(51) Int. Cl.
*G11C 16/10* (2006.01)
*G11C 16/34* (2006.01)
*G11C 16/04* (2006.01)

(52) U.S. Cl.
CPC .......... *G11C 16/10* (2013.01); *G11C 16/3459* (2013.01); *G11C 16/0483* (2013.01)

(58) Field of Classification Search
CPC ............................. G11C 16/3459; G11C 16/10
(Continued)

(56) References Cited

U.S. PATENT DOCUMENTS

2010/0046289 A1* 2/2010 Baek .................... G11C 16/349
365/185.2
2011/0161571 A1* 6/2011 Kim .................... G11C 11/5628
711/E12.001
(Continued)

FOREIGN PATENT DOCUMENTS

CN    113228184 A    8/2021
CN    113646843 A    11/2021

OTHER PUBLICATIONS

International Search Report directed to International Patent Application No. PCT/CN2023/078444, mailed Jun. 2, 2023; 3 pages.
(Continued)

*Primary Examiner* — Muna A Techane
(74) *Attorney, Agent, or Firm* — Conley Rose, P.C.

(57) ABSTRACT

The present disclosure provides a programming method, a memory device and a memory system. The method includes, based on coupling offsets, dividing target programmed states into N groups, each group corresponding to a different first programmed state, wherein an i-th group has $K_i$ number of different target programmed states and corresponds to an i-th first programmed state. At least two groups of target programmed states have two different numbers of target programmed states. The method also includes performing a first program operation to program memory cells to respective first programmed states; and performing a second program operation to program an i-th group of memory cells at the i-th first programmed state to $K_i$ number of different target programmed states.

20 Claims, 14 Drawing Sheets

(58) Field of Classification Search
USPC .................................................. 365/185.22
See application file for complete search history.

(56) References Cited

U.S. PATENT DOCUMENTS

| | | | |
|---|---|---|---|
| 2013/0155769 A1* | 6/2013 | Li ...................... | G11C 16/0483 365/185.03 |
| 2015/0113342 A1* | 4/2015 | Jung ..................... | G06F 11/26 714/721 |
| 2017/0011801 A1* | 1/2017 | Park ..................... | G11C 16/12 |
| 2020/0395077 A1* | 12/2020 | Lee ..................... | G11C 16/3459 |
| 2021/0295942 A1* | 9/2021 | Yamaki ................. | G11C 29/028 |

OTHER PUBLICATIONS

Yangtze Memory Technologies C,O., Ltd., "First Examination Opinion Notice," Pub. Date: Sep. 16, 2025, Chinese Patent App. No. 202380008618.X, 11 p. (plus 11 p. translation).

* cited by examiner

|  | ER (P0) | P1 | P2 | P3 | P4 | P5 | P6 | P7 |
|---|---|---|---|---|---|---|---|---|
| upper page (UP) | 1 | 1 | 1 | 0 | 0 | 0 | 0 | 1 |
| middle page (MP) | 1 | 1 | 0 | 0 | 1 | 1 | 0 | 0 |
| lower page (LP) | 1 | 0 | 0 | 0 | 0 | 1 | 1 | 1 |

METHOD FOR PROGRAMMING MEMORY DEVICE, MEMORY DEVICE AND MEMORY SYSTEM

INCORPORATION BY REFERENCE

This application claims priority to International Patent Application No. PCT/CN2023/078444 filed on Feb. 27, 2023, which claims priority to Chinese Patent Application No. 202210203975.9 filed on Mar. 3, 2022, all of which are incorporated herein by reference in their entirety.

TECHNICAL FIELD

The present disclosure relates to the field of memory, and relates to but not limited to a method for programming a memory device, a memory device, and a memory system.

BACKGROUND

As memory devices are shrinking to smaller die size to reduce manufacturing cost and increase storage density, scaling of planar memory cells faces challenges due to process technology limitations and reliability issues. A three-dimensional (3D) memory architecture can address the density and performance limitation in planar memory cells.

In a 3D NAND memory device, a memory array can include a plurality of memory strings vertically arranged on a substrate, each memory string having a plurality of memory cells that are vertically stacked. As such, storage density per unit area can be greatly increased. In a 3D NAND memory device, memory cells sharing the same word line can be programmed and read out simultaneously.

To further increase the storage capacity in a 3D NAND memory device, each memory cell can be programmed with multi-levels. For example, in a multi-level cell (MLC) mode, each memory cell can store 2 bits of data. In a triple-level cell (TLC) mode, each memory cell can store 3 bits of data. And in a quad-level cell (QLC) mode, each memory cell can store 4 bits of data. As the number of bits stored in each memory cell increases, the time required to program a memory device also increases. Also, when the number of bits stored in a memory cell increases, the read margin can be reduced. Therefore, there is a need for a method for efficiently programming memory cells and more accurately reading after programming.

BRIEF SUMMARY

Implementations of methods for programming a memory device, a memory device, and a memory system are described in the present disclosure.

One aspect of the present disclosure provides methods for programming a memory device. The method includes performing a first program operation on memory cells to be programmed such that each of the memory cells is programmed to a respective one of N different first programmed states; wherein, N is a positive integer greater than 1 and less than M, and M is a total number of target programmed states of the memory cells. The method also includes performing a second program operation on a subset of the memory cells at an ith first programmed state such that the subset of the memory cells are programmed from the ith first programmed state to k number of the target programmed states, wherein k is greater than or equal to 1 and less than N; and i is greater than or equal to 1, and less than or equal to N. At least two first programmed states correspond to different k values.

In some implementations, the method further includes dividing the target programmed states into N groups that correspond to the N first programmed states. The dividing of the N groups is based on coupling offsets of the target programmed states due to the first and/or the second program operations. Each of the N groups corresponds to the k number of the target programmed states.

In some implementations, the performing of the first program operation includes performing the first program operation according to the N groups, wherein each of the memory cells is programmed to the respective one of the N different first programmed states according to the N groups.

In some implementations, the method further includes grouping adjacent target programmed states in a same group when the coupling offsets of the adjacent target programmed states are within a predetermined range.

In some implementations, the method further includes grouping a first group of adjacent target programmed states, whose coupling offsets are less than a first preset threshold value, into the first group; grouping a second group of adjacent target programmed states, whose coupling offsets are greater than or equal to the first preset threshold value but less than a second preset threshold value, into the second group; and grouping a third group of adjacent target programmed states, whose coupling offsets are greater than or equal to the second preset threshold value, into the third group.

In some implementations, the method further includes measuring the coupling offsets of the target programmed states from memory cells coupled to adjacent word lines.

In some implementations, the method further includes, after performing the first program operation, performing a first verification operation on each of the memory cells to determine whether each of the memory cells is programmed to the respective one of N different first programmed states.

In some implementations, the method further includes performing the first program operation on each of the memory cells during each of one or more loops, wherein after each of the one or more loops, it is determined whether to proceed to a next loop according to results of the first verification operation. The first program operation is stopped if the results show that the memory cells pass the first verification operation. Otherwise, the first program operation proceeds to the next loop until each of the memory cells is programmed to the respective one of N different first programmed states.

In some implementations, the method further includes determining the N different first programmed states using N different first verification voltages.

In some implementations, the method further includes, after performing the second program operation, performing a second verification operation on each of the memory cells to determine whether each of the memory cells is programmed to the target programmed state, wherein different second verification voltages are used to determine whether the subset of the memory cells at the ith first programmed state are programmed to the k number of different target programmed states.

In some implementations, a respective first verification voltage corresponding to the ith first programmed state is smaller than any second verification voltages used for verifying the k number of target programmed states.

In some implementations, each of the memory cells is a triple-level cell (TLC) having 8 states, or a quad-level cell (QLC) having 16 states.

Another aspect of the present disclosure provides a memory device that includes a memory array having memory cells. The memory device also includes a peripheral circuit coupled to the memory array and configured to perform a first program operation on the memory cells such that each of the memory cells is programmed to a respective one of N different first programmed states; wherein, N is a positive integer greater than 1 and less than M, and M is a total number of target programmed states of the memory cells. The peripheral circuit is also configured to perform a second program operation on a subset of the memory cells at an ith first programmed state such that the subset of the memory cells are programmed from the ith first programmed state to k number of the target programmed states, wherein k is greater than or equal to 1 and less than N; and i is greater than or equal to 1 and less than or equal to N. At least two first programmed states correspond to different k values.

In some implementations, after performing the first program operation, the peripheral circuit is further configured to perform a first verification operation on each of the memory cells to determine whether each of the memory cells is programmed to the respective one of N different first programmed states.

In some implementations, after performing the second program operation, the peripheral circuit is further configured to perform a second verification operation on each of the memory cells to determine whether each of the memory cells is programmed to the target programmed state, wherein different second verification voltages are used to determine whether the subset of the memory cells at the ith first programmed state are programmed to the k number of target programmed states.

In some implementations, each of the memory cells is a triple-level cell (TLC) having 8 states, or a quad-level cell (QLC) having 16 states.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated herein and form a part of the specification, illustrate implementations of the present disclosure and, together with the description, further serve to explain the principles of the present disclosure and to enable a person skilled in the pertinent art to make and use the present disclosure.

FIG. 1H illustrates a mapping scheme of binary codes and logic states of a memory device, according to some implementations of the present disclosure.

Figure 1A:
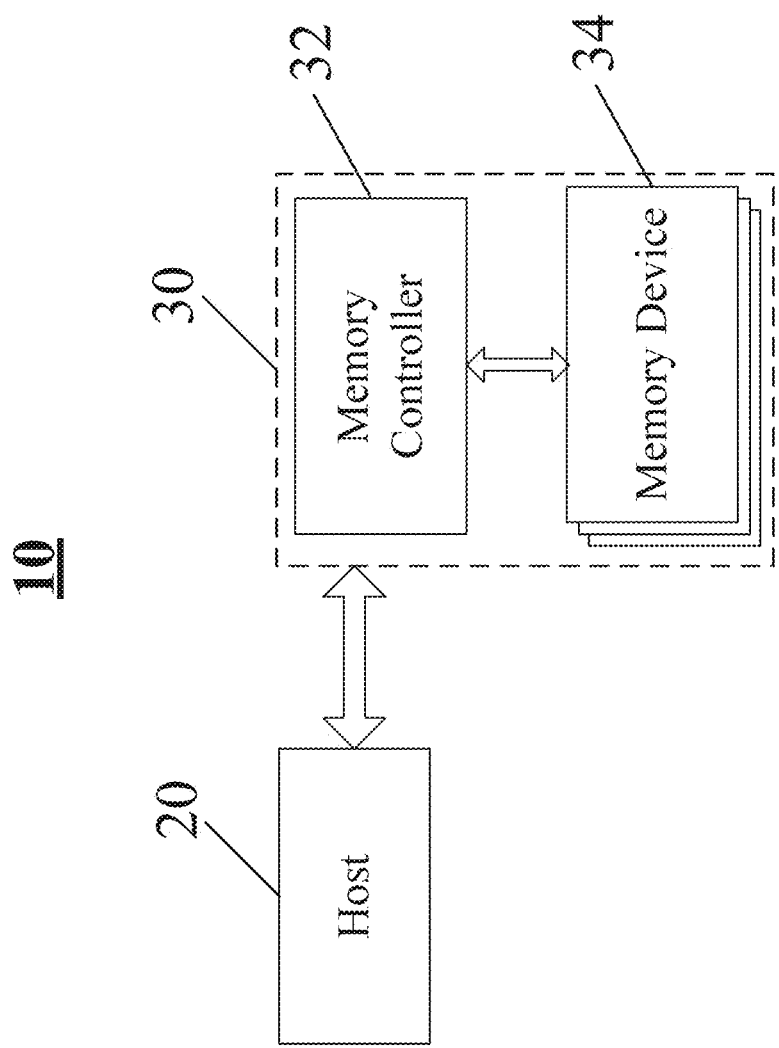
FIG. 1A illustrates a block diagram of an exemplary system having a memory device, according to some implementations of the present disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Implementations of the present disclosure will be described with reference to the accompanying drawings. Although the preferred implementations of the present disclosure are shown in the drawings, the present disclosure can be implemented in many different forms and is not limited to the implementations described herein.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one implementation," "an implementation," "an example implementation," "some implementations," etc., indicate that the implementation described can include a particular feature, structure, or characteristic, but every implementation can not necessarily include the particular feature, structure, or characteristic. Moreover, such phrases do not necessarily refer to the same implementation. Further, when a particular feature, structure or characteristic is described in connection with an implementation, it would be within the knowledge of a person skilled in the pertinent art to affect such feature, structure or characteristic in connection with other implementations whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or 30% of the value).

Unless defined otherwise, all technical and scientific terms used herein have similar meaning as commonly understood by one of ordinary skill in the art to which this disclosure belongs. The terms used herein in the specification of the present disclosure are only for the purpose of describing specific implementations, and are not intended to limit the present disclosure.

FIG. 1A illustrates a block diagram of an exemplary system 10 having a host 20 and a memory system 30, according to some aspects of the present disclosure. System 10 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having the memory system 30. The host 20 can be a processor of an electronic device, such as a central processing unit (CPU), or a system-on-chip (SoC), such as an application processor (AP). The host 20 can be configured to send or receive data to or from the memory system 30.

In some implementations, the memory system 30 includes one or more memory devices 34 and a memory controller 32. The memory device 34 can be any memory device, including but not limited to NAND Flash Memory, Vertical NAND Flash Memory, NOR Flash Memory, Dynamic Random Access Memory (DRAM), Ferroelectric Random Access Memory (FRAM), Magnetoresistive Random Access Memory (MRAM), Phase Change Random Access Memory (PCRAM), Resistive Random Access Memory (RRAM), Nano Random Access Memory (NRAM), etc.

Memory controller 32 is coupled to memory device 34 and host 20, and is configured to control memory device 34, according to some implementations. In some implementations, memory controller 32 is designed for operating in a low duty-cycle environment like secure digital (SD) cards, compact Flash (CF) cards, universal serial bus (USB), Flash drives, or other media for use in electronic devices, such as personal computers, digital cameras, mobile phones, etc. In some implementations, memory controller 32 is designed for operating in a high duty-cycle environment, e.g., SSDs or embedded multi-media-cards (eMMCs), used as data storage for mobile devices, such as smartphones, tablets, laptop computers, etc., and enterprise storage arrays. Memory controller 32 can manage the data stored in memory device 34 and communicate with host 20. Memory controller 32 can be configured to control operations of memory device 34, such as read, erase, and program operations. Memory controller 32 can also be configured to manage various functions with respect to the data stored or to be stored in memory device 34 including, but not limited to bad-block management, garbage collection, logical-to-physical address conversion, wear leveling, etc. In some implementations, memory controller 32 is further configured to process error correction codes (ECCs) with respect to the data read from or written to memory device 34. Any other suitable functions may be performed by memory controller 32 as well, for example, formatting memory device 34. Memory controller 32 can communicate with an external device (e.g., host 20) according to a particular communication protocol. For example, memory controller 32 may communicate with the external device through at least one of various interface protocols, such as a USB protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 1B:
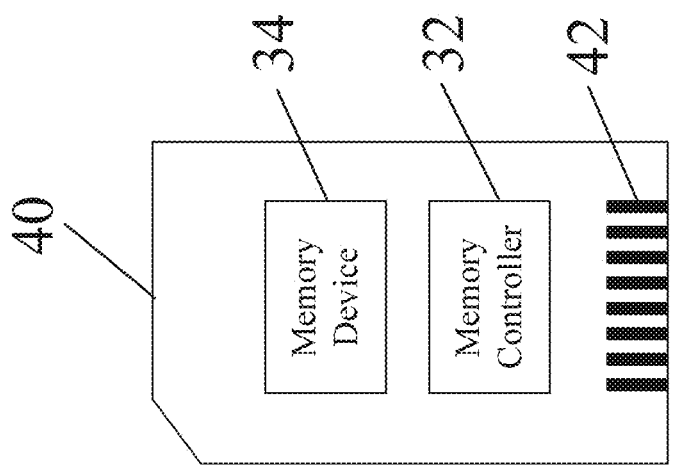
FIG. 1B illustrates a diagram of an exemplary memory card having a memory device, according to some implementations of the present disclosure.
Figure 1C:
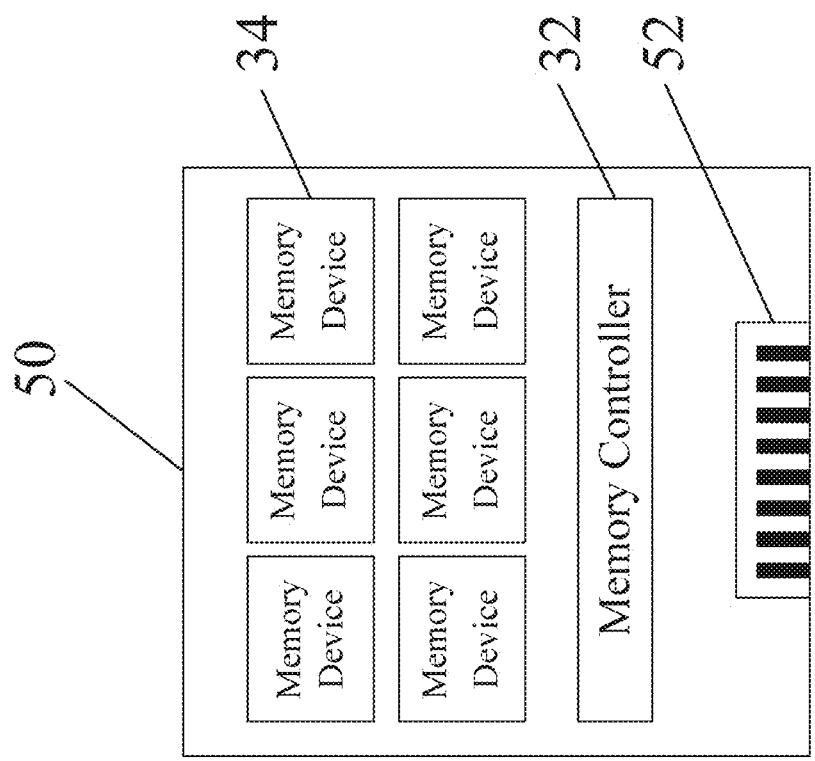
FIG. 1C illustrates a diagram of an exemplary solid-state drive (SSD) having a memory device, according to some implementations of the present disclosure.

Memory controller 32 and one or more memory devices 34 can be integrated into various types of storage devices, for example, being included in the same package, such as a universal Flash storage (UFS) package or an eMMC package. That is, memory system 30 can be implemented and packaged into different types of end electronic products. In one example as shown in FIG. 1B, memory controller 32 and a single memory device 34 may be integrated into a memory card 40. Memory card 40 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 40 can further include a memory card connector 42 coupling memory card 40 with a host (e.g., host 20 in FIG. 1A). In another example as shown in FIG. 1C, memory controller 32 and multiple memory devices 34 may be integrated into an SSD 50. SSD 50 can further include an SSD connector 52 coupling SSD 50 with a host (e.g., host 20 in FIG. 1A). In some implementations, the storage capacity and/or the operation speed of SSD 50 is greater than those of memory card 40.

Figure 1D:
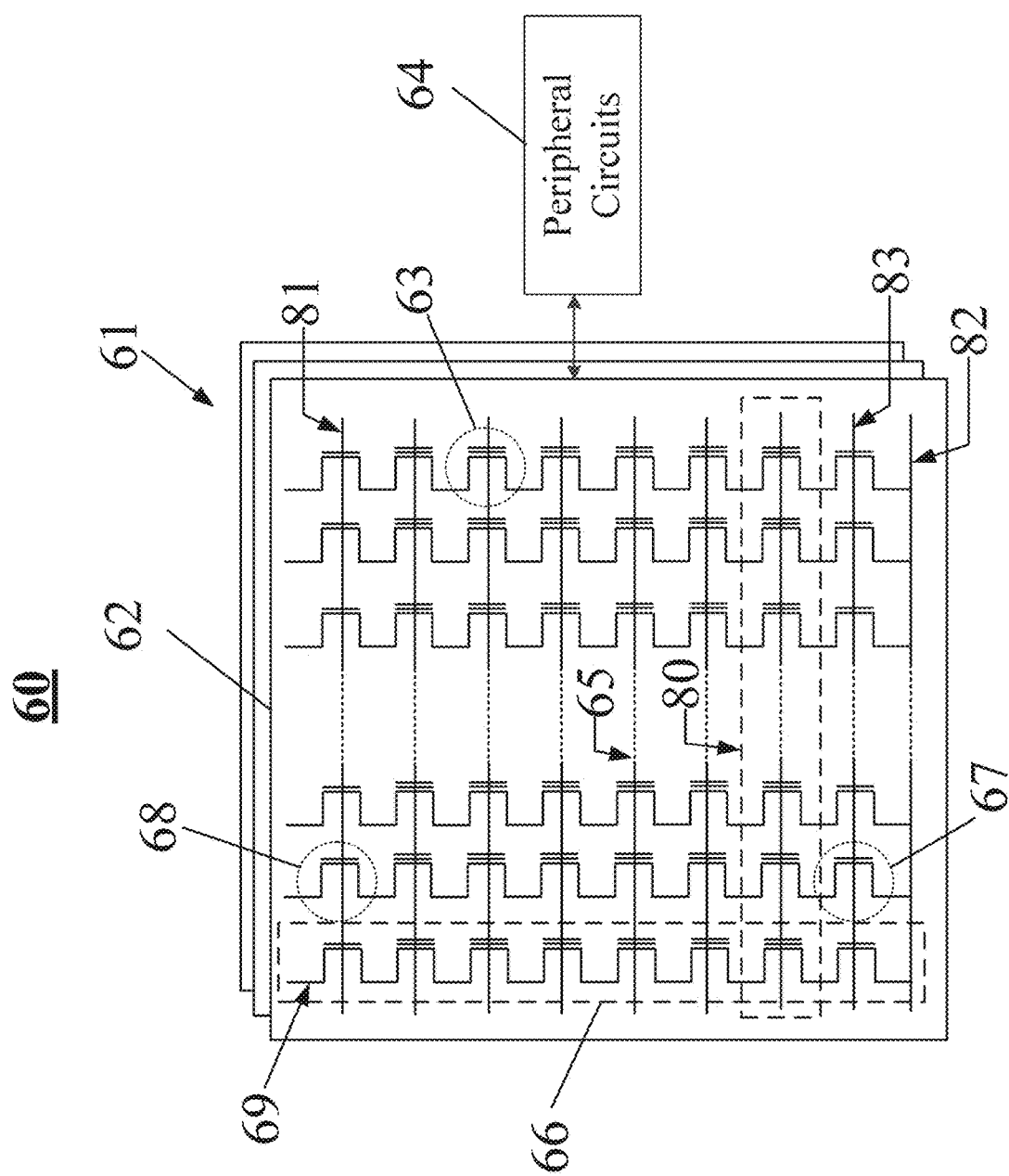
FIG. 1D illustrates a schematic diagram of an exemplary memory device, according to some implementations of the present disclosure.

The memory devices described in the present disclosure may be a semiconductor memory, which is a solid-state electronic device that stores data information and is manufactured using a semiconductor integrated circuit process. FIG. 1D illustrates a schematic circuit diagram of an exemplary memory device 60 including peripheral circuits, according to some aspects of the present disclosure. Memory device 60 can be an example of memory device 34 in FIG. 1A. Memory device 60 can include a memory array 61 (also referred to as "memory cell array" or "array") and peripheral circuits 64 coupled to the memory array 61. Memory array 61 can include an array of memory cells 63. In some implementations, the memory array 61 includes memory strings 66 (also referred to as "NAND memory strings"), each having a plurality of memory cells 63 coupled in series.

In some implementations, the memory device 60 can be formed based on the floating gate technology. In some implementations, the memory device 60 can be formed based on charge trapping technology to provide high storage density and high intrinsic reliability. In some implementations, each memory cell 63 can hold a continuous, analog value, such as an electrical voltage that depends on the amount of electronic charges (e.g., electrons) trapped in a storage layer of the memory cell 63. Storage data or logic states can be determined by, e.g., a threshold voltage $V_{th}$ of the memory cell 63 based on the amount of electronic charges trapped in the storage layer. In some implementations, the memory device 60 can be a three-dimensional (3D) memory device, where the memory cells 63 can be vertically stacked on top of each other.

In some implementations, each memory cell 63 is a single level cell (SLC) that has two possible logic states (also referred to "states" and "levels") and thus can store one bit of data. For example, logic "0" can correspond to a first range of threshold voltages, and logic "1" can correspond to a second range of threshold voltages. Initially, all memory cells 63 can be reset to the erased state ER or P0 (e.g., logic "1") by removing all the trapped electronic charges in the storage layer of the memory cells. Through programming or writing, electronic charges can be injected into the storage layers of the memory cells 63, and thereby increase the threshold voltages $V_{th}$ of the memory cells 63. As such, the memory cells 63 can be programmed to the programmed state P1 (e.g., logic "0"). In some implementations, each memory cell 63 can store more than one bit of data. For example, a multi-level cell (MLC) can have four states (P0-P3) and store two bits per memory cell. The memory cells 63 can be programmed from the erased state ER (P0) to one of three programmed states (P1, P2, P3). Similarly, a triple-level cell (TLC) can have eight states (P0-P7) and store 3 bits per memory cell, and a quad-level cell (QLC) can have sixteen states (P0-P15) and store 4 bits per memory cell. In general, a memory cell in an nLC mode can have $2^n$ states and can store n-bit of data, where n is a whole number.

As shown in FIG. 1D, each memory string 66 can also include a source select gate (SSG) transistor 67 at its source end and a drain select gate (DSG) transistor 68 at its drain end. SSG transistor 67 and DSG transistor 68 can be configured to activate selected memory strings 66 (columns of the array) during read and program operations. In some implementations, the sources of memory strings 66 in a same block 62 (also referred to as "memory block") are coupled through a same source line 82, e.g., a common source line. In some implementations, the common source line 82 of all memory strings 66 in the memory array 61 are coupled to an array common source (ACS). The drain of each memory string 66 is coupled to a respective bit line 69 from which data can be read or written, according to some implementations. In some implementations, each memory string 66 is configured to be selected or unselected by applying a select voltage or an unselect voltage to the gate of respective DSG transistor 68 through one or more DSG lines 81 and/or by applying a select voltage or an unselect voltage to the gate of respective SSG transistor 67 through one or more SSG lines 83.

As shown in FIG. 1D, memory strings 66 can be organized into multiple blocks 62, each of which can have a common source line 82. In some implementations, each block 62 is the basic data unit for erase operations, i.e., all memory cells 63 in the same block 62 are erased at the same time. In some implementations, control gates (gate electrodes) of the memory cells 63 in a row can be connected to a same word line 65. Accordingly, a row of memory cells 63 coupled to the same word line 65 can be read and program at the same time during read and program operations. Thus, a page 80 (also referred to as "memory page" or "physical memory page") of memory cells 63 coupled to the same word line 65 can be the basic data unit for read and program operations.

Figure 1E:
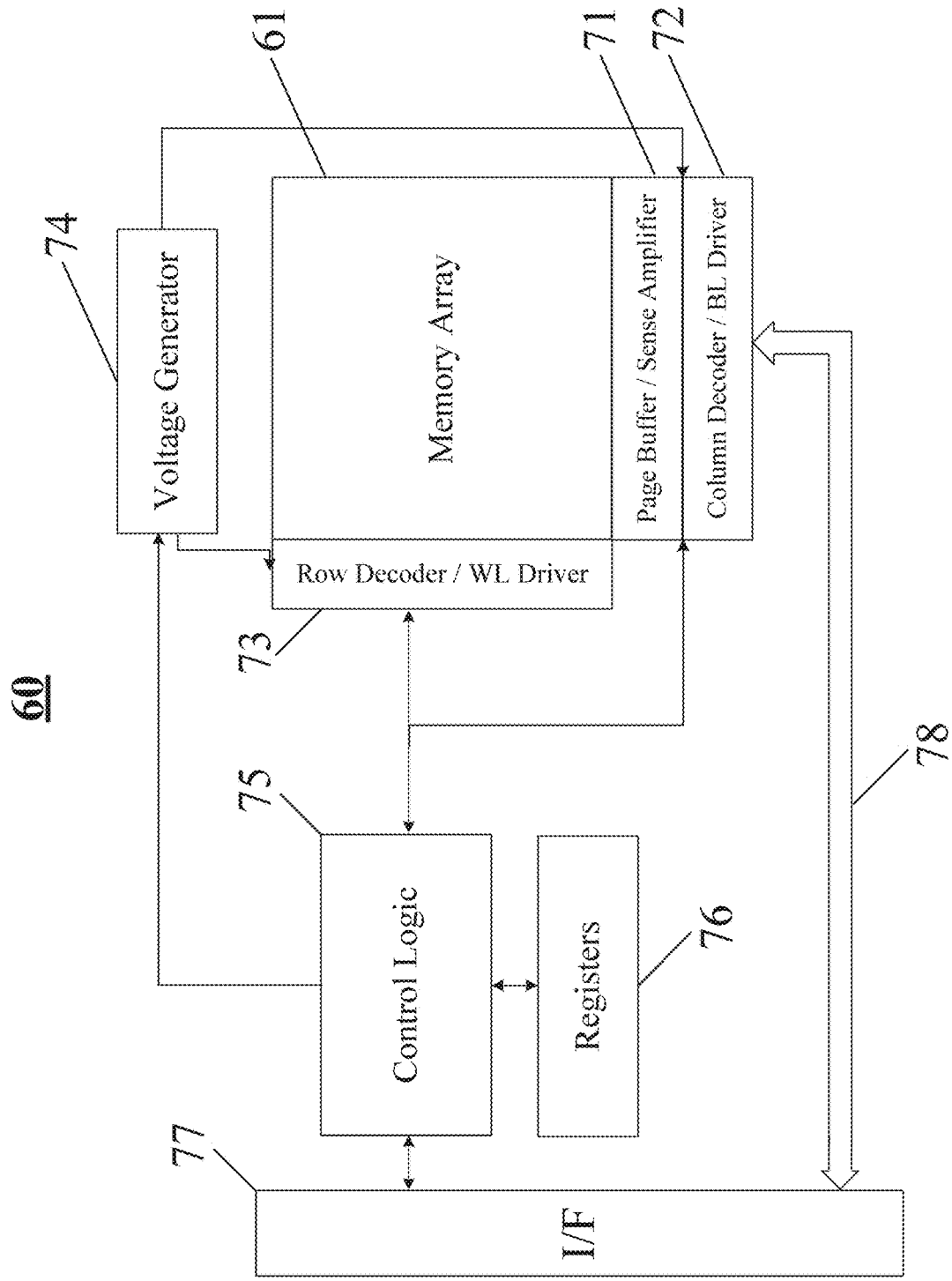
FIG. 1E illustrates a block diagram of an exemplary memory device including a memory array and peripheral circuits, according to some implementations of the present disclosure.

The peripheral circuits 64 can be coupled to the memory array 61 through bit lines 69, word lines 65, source lines 82, SSG lines 83, and DSG lines 81. The peripheral circuit 64 can include any suitable analog, digital, and mixed-signal circuits for facilitating the operations of memory array 61 by applying and sensing voltage signals and/or current signals to and from each target memory cell 63 through bit lines 69, word lines 65, source lines 82, SSG lines 83, and DSG lines 81. Peripheral circuits 64 can include various types of peripheral circuits formed using metal-oxide-semiconductor (MOS) technologies. FIG. 1E illustrates some peripheral circuits including a page buffer/sense amplifier 71, a column decoder/bit line driver 72, a row decoder/word line driver 73, a voltage generator 74, control logic 75, registers 76, an interface 77, and a data bus 78. It is understood that in some examples, additional peripheral circuits not shown in FIG. 1E may be included as well.

Referring to FIGS. 1D and 1E, the page buffer/sense amplifier 71 can be configured to read and program (write) data from and to memory array 61 according to control signals from control logic 75. In one example, the page buffer/sense amplifiers 71 can store a logic page of programming data (write data) to be programmed into the memory page 80 of memory array 61. In another example, the page buffer/sense amplifiers 71 can verify the programmed states of the target memory cells 63 coupled to a selected word line 65 in each program/verify loop (cycle) during a program operation to ensure that the data in the logic page have been properly programmed into the target memory cells 63. In still another example, the page buffer/sense amplifiers 71 can also sense low power signals from the bit lines 69 that represents the data stored in the target memory cells 63 and amplify the low power signals to recognizable logic states of the target memory cells 63 in a read operation. In some implementations, each of the page buffer/sense amplifiers 71 can include storage modules (e.g., latches, caches, registers, etc.) for temporarily storing the n-bits data received from data bus 78 and providing the n-bits data to a corresponding target memory cell 63 through the corresponding bit line 69.

Column decoder/bit line driver 72 can be controlled by control logic 75 to apply bit line voltages generated from voltage generator 74 to select one or more memory strings 66. Row decoder/word line driver 73 can be controlled by control logic 75 to select/unselect blocks 62 of memory array 61 and select/unselect word lines 65 of block 62. Row decoder/word line driver 73 can be further configured to drive word lines 65 using word line voltages generated from voltage generator 74. In some implementations, row decoder/word line driver 73 can also select/unselect and drive SSG lines 83 and DSG lines 81 as well. Voltage generator 74 can be controlled by control logic 75 to generate word line voltages (e.g., read voltage, program voltage, erase voltage, verification voltage, etc.), bit line voltages, and source line voltages to be supplied to memory array 61.

Control logic 75 can be coupled to each peripheral circuit described above and configured to control the operations of each peripheral circuit. Registers 76 can be coupled to control logic 75 and include status registers, command registers, and address registers for storing status information, command operation codes (OP codes), and command addresses for controlling the operations of each peripheral circuit. Interface 77 can be coupled to control logic 75 and act as a control buffer to buffer and relay control commands received from the host 20 (in FIG. 1) to control logic 75 and status information received from control logic 75 to the host 20. Interface 77 can also be coupled to column decoder/bit line driver 72 via data bus 78 and act as a data input/output (I/O) interface and a data buffer to buffer and relay the data to and from memory array 61.

Figure 1F:
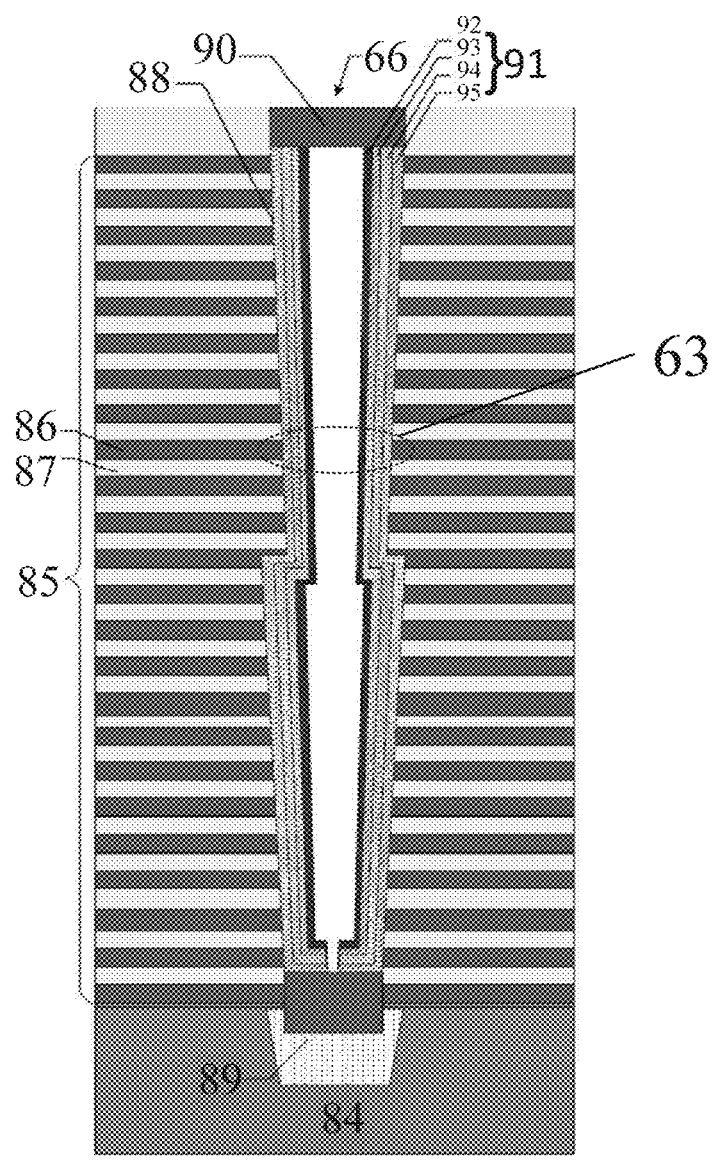
FIG. 1F illustrates a cross-section of an exemplary memory array including a NAND memory string, according to some implementations of the present disclosure.

FIG. 1F illustrates a cross-sectional view of exemplary memory array 61, according to some implementations of the present disclosure. As shown in FIG. 1F, the memory string 66 of the memory array 61 can extend vertically through a memory stack 85 above a substrate 84. Substrate 84 can include silicon (e.g., single crystalline silicon), silicon germanium (SiGe), gallium arsenide (GaAs), germanium (Ge), silicon on insulator (SOI), germanium on insulator (GOI), or any other suitable materials.

Memory stack 85 can include interleaved conductive layers 86 and dielectric layers 87. The number of the pairs of conductive layers 86 and dielectric layers 87 in memory stack 85 can determine the number of memory cells 63 in memory array 61. The conductive layer 86 can include conductive materials including, but not limited to, tungsten (W), cobalt (Co), copper (Cu), aluminum (Al), polysilicon, doped silicon, silicides, or any combination thereof. In some implementations, each conductive layer 86 includes a metal layer, such as a tungsten layer. In some implementations, each conductive layer 86 includes a doped polysilicon layer. The conductive layers 86 can function as gate electrodes for memory cells 63, DSG transistors 68 and SSG transistors 67 (see FIG. 1D), and can extend laterally to form DSG line 81 at a top portion of memory stack 85, SSG line 83 at a bottom portion of memory stack 85, and word lines 65 between DSG line 81 and SSG line 83.

As shown in FIG. 1F, memory string 66 includes a channel structure 88 extending vertically through memory stack 85. In some implementations, channel structure 88 includes a channel hole, where a sidewall of the channel hole is covered by a semiconductor channel 92 and a memory film 91. In some implementations, semiconductor channel 92 includes silicon, such as polysilicon. In some implementations, memory film 91 is a composite dielectric layer including a tunneling layer 93, a storage layer 94 (also known as a "charge trap/storage layer"), and a blocking layer 95. Channel structure 88 can have a cylinder shape (e.g., a pillar shape). Semiconductor channel 92, tunneling layer 93, storage layer 94, blocking layer 95 are arranged radially from the center toward the outer surface of the pillar in this order, according to some implementations. Tunneling layer 93 can include silicon oxide, silicon oxynitride, or any combination thereof. Storage layer 94 can include silicon nitride, silicon oxynitride, silicon, or any combination thereof. Blocking layer 95 can include silicon oxide, silicon oxynitride, high dielectric constant (high-k) dielectrics, or any combination thereof. In one example, memory film 91 may include a composite layer of silicon oxide/silicon oxynitride/silicon oxide (ONO).

As shown in FIG. 1F, a well 89 (e.g., a P-well and/or an N-well) is formed in substrate 84, and the source end of memory string 66 is in contact with well 89, according to some implementations. For example, source line 82 (in FIG. 1D) can be coupled to the well 89. During an erase operation, an erase voltage ($V_{erase}$) can be applied to the well 89. In some implementations, memory string 66 further includes a channel plug 90 at the drain end of memory string 66. In some implementations, the channel plug 90 of each memory string 66 is coupled to a respective bit line 69 (in FIG. 1D). It is understood that although not shown in FIG. 1F, additional components of memory array 61 can be formed including, but not limited to, gate line slits/source contacts, local contacts, interconnect layers, etc.

Figure 1G:
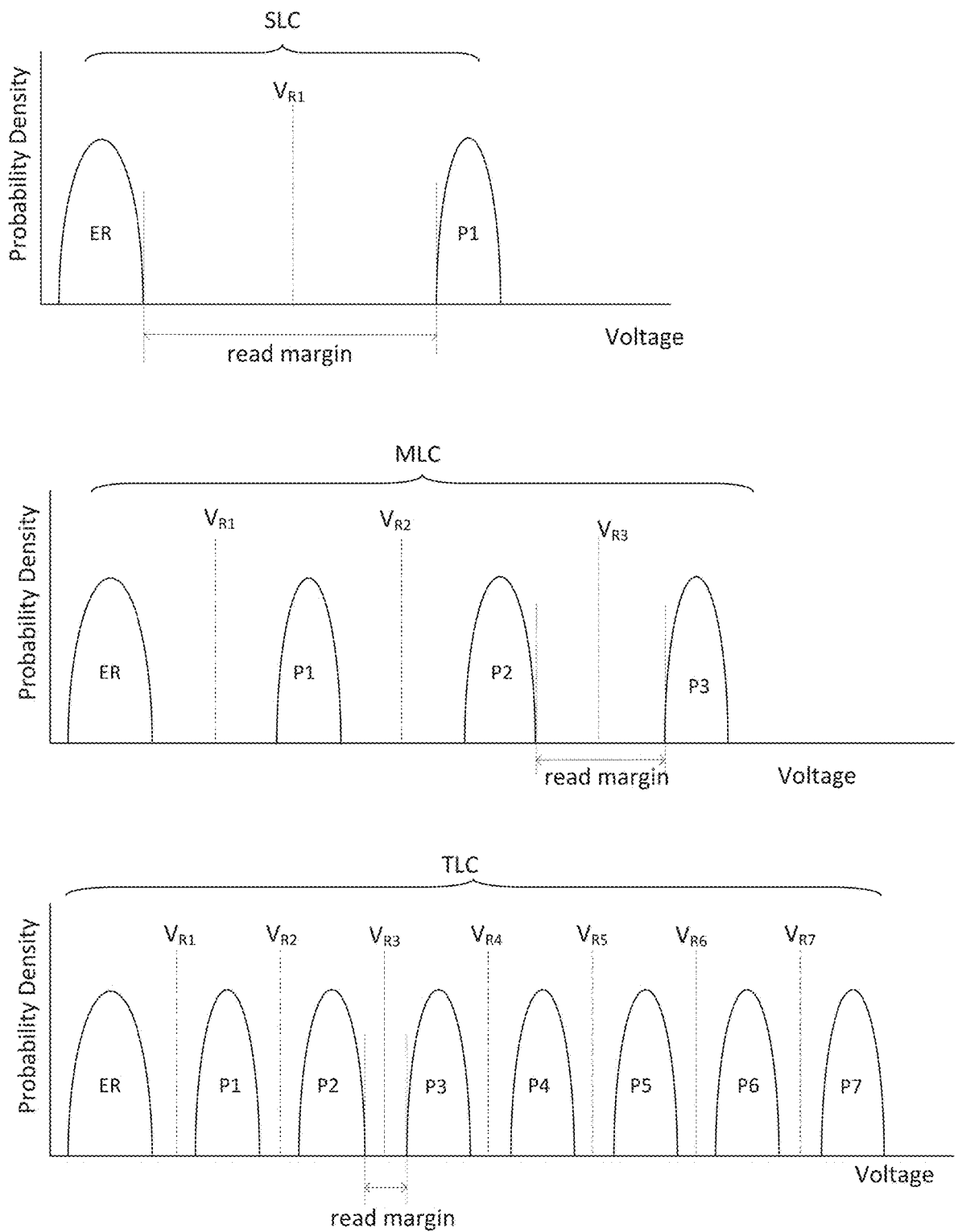
FIG. 1G illustrates threshold voltage distributions in a memory device, according to some implementations of the present disclosure.

FIG. 1G illustrates a threshold voltage $V_{th}$ distribution of memory cells of a memory device programmed in the nLC mode, according to some implementations of the present disclosure. Due to various variations, each state of the memory cells includes a range of threshold voltages $V_{th}$, where the threshold voltage $V_{th}$ distribution of each state can be represented by a probability density. In some implementations, each state of the nLC mode (SLC, MLC, TLC, QLC, etc.) can be programmed by using an incremental step pulse programming (ISPP) scheme where the program voltage applied to the selected word line can be incrementally increased by adding a step pulse $V_{step}$. For example, the eight TLC states can be programmed from the state P0 to the state P1 having a lower threshold voltage first, and then state P2, P3, . . . , to the state P7 having a higher threshold voltage. In some implementation, the $2^n$ states of the nLC mode can be programmed from the state P0 to the state P1, P2, . . . , $P(2^n-1)$ sequentially. As shown in FIG. 1G, from the state P0 to the state $P(2^n-1)$, threshold voltage $V_{th}$ of the memory cell increases. Therefore, the state P0 is also referred to as a lowest state and the state $P(2^n-1)$ is also referred to as a highest state. A higher state has higher threshold voltages and a lower state has lower threshold voltages.

The states of a memory cell can be mapped into data in the form of binary codes stored in a NAND memory device. For example, the $2^n$ state of an n-bit memory cell can be represented in the form of a Gray code. A Gray code, i.e., reflected binary code (RBC) or reflected binary (RB), is an ordering of the binary numeral system such that two successive values differ in only one bit (binary digit). Using Gray codes allows for easier error correction of programmed and/or read data because the codes of any adjacent states differ by only one binary digit.

FIG. 1H illustrates a mapping scheme of 3-bit binary codes and the states of a memory device programmed in TLC mode, according to some implementations of the present disclosure. In this example, the eight states (states P0-P7) in the TLC mode can correspond to 3-bit binary codes (111), (110), (100), (000), (010), (011), (001) and (101), respectively. In the TLC mode, the 3 bits of the binary codes can be named as a most significant bit (MSB), a center significant bit (CSB), and a least significant bit (LSB), reading from left to right. For example, the state P5 can be mapped to the binary code (011), where the MSB, CSB and LSB are "0," "1," and "1," respectively. In some implementations, the memory cells in the same physical memory page (e.g., page 80 in FIG. 1D) can be read or programmed simultaneously, where each memory cell in the same physical memory page can be programmed according to the programming data in the logic pages, e.g., in the TLC mode, a lower page (LP), a middle page (MP) and an upper page (UP) corresponding to the LSB, CSB and MSB of the binary codes, respectively.

During programming, logic pages of the n-bit binary codes (i.e., programming data) can be temporarily stored in the page buffers 71 (FIG. 1E) for a respective physical memory page. The memory device can be programmed and/or read on a page-by-page basis. In the nLC mode, the physical memory page can be programmed according to data in n logic pages, where each memory cell can be programmed to one of the $2^n$ states represented by the n-bit of binary codes in the n logic pages. In the other words, one physical memory page can store n logic pages of data. It is noted that the scope of the present disclosure is not limited to the mapping scheme shown in FIG. 1H. The memory device and system and the methods disclosed herein can be applied to a different set of binary codes associated with the $2^n$ states of nLC mode.

Referring back to FIG. 1G, the state of a memory cell can be determined by comparing the threshold voltage $V_{th}$ of the memory cell with one or more read reference voltages $V_R$ (e.g., $V_{R1}$, $V_{R2}$, . . . ) (also referred to as "verification voltages"). State or data stored in the memory cells can thereby be determined. A read reference voltage $V_R$ can be selected within a read margin between two adjacent states, i.e., between a highest possible threshold voltage of a lower state and a lowest possible threshold voltage of a higher state. Using the eight TLC states P0-P7 in FIG. 1G as an example, by applying the read reference voltages $V_{R1}$-$V_{R7}$ to the selected word line 65 coupled to a target memory cell, Similarly, in the QLC mode, the 16 states can be represented by a set of 4-bit binary codes. TABLE 1 shows an exemplary one-to-one mapping of the binary codes and the 16 states P0-P15. For example, state P0 corresponds to (1111), and state P15 corresponds to (0111). Each memory cell of a same physical memory page can be programmed to one of the 16 states according to the data in the logic pages, i.e., the lower page (LP), middle page (MP), upper page (UP) and extra page (XP).

TABLE 1

| States | P0 | P1 | P2 | P3 | P4 | P5 | P6 | P7 | P8 | P9 | P10 | P11 | P12 | P13 | P14 | P15 | Read# |
|---|---|---|---|---|---|---|---|---|---|---|---|---|---|---|---|---|---|
| XP | 1 | 1 | 0 | 0 | 0 | 0 | 0 | 0 | 1 | 1 | 1 | 1 | 1 | 1 | 0 | 0 | 3 |
| UP | 1 | 1 | 1 | 1 | 1 | 0 | 0 | 0 | 0 | 1 | 1 | 0 | 0 | 0 | 0 | 1 | 4 |
| MP | 1 | 1 | 1 | 0 | 0 | 0 | 0 | 1 | 1 | 0 | 0 | 0 | 0 | 1 | 1 | 1 | 4 |
| LP | 1 | 0 | 0 | 0 | 1 | 1 | 0 | 0 | 0 | 0 | 0 | 1 | 1 | 1 | 1 | 1 | 4 | the range of the memory cell's threshold voltage $V_{th}$ can be determined. For example, to verify if a target memory cell is at state P0, the read reference voltage $V_{R1}$ can be used. If the target memory cell is at state P0, the threshold voltage $V_{th}$ of the target memory cell is lower than the read reference voltage $V_{R1}$. The target memory cell can be switched on and form a conductive path in the channel. If the target memory cell is at any one of the states P1-P7, the threshold voltage $V_{th}$ of the target memory cell is higher than the read reference voltage $V_{R1}$. The target memory cell is thereby switched off. By measuring or sensing the current through the target memory cell or a voltage drop at the corresponding bit line, the threshold voltage $V_{th}$ or the state of the target memory cell can be determined.

To determine the two states P0 and P1 stored in the SLC mode, only the read reference voltage $V_{R1}$ is needed. To determine the four states P0-P3 in the MLC mode, the read reference voltages $V_{R1}$, $V_{R2}$ and $V_{R3}$ can be used. To determine the eight states P0-P7 for the TLC mode, the read reference voltages $V_{R1}$-$V_{R7}$ can be used. For example, in the TLC mode, the threshold voltage of state P0 is below $V_{R1}$, and the threshold voltage of state P7 is above $V_{R7}$, where the threshold voltages of state P1 is between $V_{R1}$ and $V_{R2}$. States P2-P6 can be determined similarly. Likewise, in the QLC mode, 15 read reference voltages can be used to verify the 16 states (P0-P15). To verify the $2^n$ states in the nLC mode, $2^n-1$ number of read reference voltages can be used.

In some implementations, the states of the memory cells are read and determined according to the logic pages of the mapping scheme. For example, under the TLC mode using the mapping scheme shown in FIG. 1H, a first subset of the read reference voltages, i.e., $V_{R3}$ and $V_{R7}$, can be used to determine the MSB of the target memory cell (corresponding to the upper page of the binary codes) where "1" is flipped to "0" or "0" is flipped to "1". Similarly, a second subset of the read reference voltages, i.e., $V_{R2}$, $V_{R4}$ and $V_{R6}$, can be used to determine the CSB of the target memory cell (corresponding to the middle page of the binary codes), and a third subset of the read reference voltages, i.e., $V_{R1}$ and $V_{R5}$, can be used to determine the LSB of the target memory cell (corresponding to the lower page of the binary codes). Accordingly, in the example in FIG. 1H, the data bits of the upper page (UP) can be determined by performing 2 read operations. The data bits of the middle page (MP) can be determined by performing 3 read operations. And the data bits of the lower page (LP) can be determined by performing 2 read operations.

When adjacent bit in the same logical page changes from "0" to "1" or from "1" to "0", it counts as one flip. According to mapping Table 1, the number of flips are 3, 4, 4 and 4 for the logic pages XP, UP, MP and LP, respectively. To determine the 16 QLC states according to the mapping in Table 1, 4 reads are required for LP, 4 reads for MP, and 4 reads for UP read and 3 reads for XP. When the number of flips between the logical pages are similar, it is a balanced Gray code. The Gray code shown in Table 1 is an example of balanced Gray code. Balanced Gray codes can improve read speed. For example, when using the balanced Gray code in Table 1, the maximum number of read operations per logic page is limited to 4. However, when an unbalanced Gray code is used, there can be a high number of flips for a certain logic page, which can cause reading bottleneck for other logic pages.

In some implementations, each memory cell can be programmed using multi-pass programming scheme to reduce program time and increase read margin. For example, a memory cell can be programmed to an intermediate state (also referred to as "first programmed state") during a coarse programming (also referred to as "first program operation" or "first pass"), and then the memory cell can be programmed to a final state (also referred to as "target programmed state") during a fine programming (also referred to as "second program operation" or "second pass"). For example, in the QLC mode, using a 8-16 two-pass programming scheme, the memory cells can be first programmed to 8 intermediate states and then programmed to the 16 final states in the fine programming. In another example using a 16-16 two-pass programming scheme, the memory cells can be first programmed to 16 intermediate states, and then reprogrammed to the 16 final states.

Taking a QLC memory device as an example, in the 16-16 two-pass programming scheme, data in the logical pages LP, MP, UP, and XP can be used in both the first pass (coarse programming) and in the second pass (fine programming). In the first pass, the memory cells are programmed to 16 intermediate states with a wider distribution of threshold voltages. In the second pass, the memory cells are reprogrammed to the 16 final states with a narrower distribution of threshold voltages. Although the programming speed of the two-pass programming scheme of 16-16 can be slower, the read margin can be increased and the read time can be shorter after the second pass programming.

In the 8-16 two-pass programming scheme, during the first pass, the memory cells can be programmed in the TLC mode. Table 2a shows an exemplary mapping scheme for the eight TLC states, similar to FIG. 1H.

TABLE 2a

| States | P0 | P1 | P2 | P3 | P4 | P5 | P6 | P7 | Read# |
|---|---|---|---|---|---|---|---|---|---|
| UP | 1 | 1 | 1 | 0 | 0 | 0 | 0 | 1 | 2 |
| MP | 1 | 1 | 0 | 0 | 1 | 1 | 0 | 0 | 3 |
| LP | 1 | 0 | 0 | 0 | 0 | 1 | 1 | 1 | 2 |

The memory cells can be programmed using data from the logical pages LP, MP, and UP. After the first pass, the eight TLC states can be verified using read reference voltages described above with respect to FIGS. 1G and 1H, where the "0" and "1" codes in the UP, MP and LP can be determined after 2, 3 and 2 readings, respectively. Subsequently, in a second pass, the memory cells can be programmed in the QLC mode using data from the logic pages LP, MP, UP and XP. Table 2b shows an exemplary mapping scheme for the 16 final states of QLC mode in the second pass.

TABLE 2b

| States | P0 | P1 | P2 | P3 | P4 | P5 | P6 | P7 | P8 | P9 | P10 | P11 | P12 | P13 | P14 | P15 | Read # |
|---|---|---|---|---|---|---|---|---|---|---|---|---|---|---|---|---|---|
| XP | 1 | 0 | 0 | 1 | 1 | 0 | 0 | 1 | 1 | 0 | 0 | 1 | 1 | 0 | 0 | 1 | 8 |
| UP | 1 | 1 | 1 | 1 | 1 | 1 | 0 | 0 | 0 | 0 | 0 | 0 | 0 | 0 | 1 | 1 | 2 |
| MP | 1 | 1 | 1 | 1 | 0 | 0 | 0 | 0 | 1 | 1 | 1 | 1 | 0 | 0 | 0 | 0 | 3 |
| LP | 1 | 1 | 0 | 0 | 0 | 0 | 0 | 0 | 0 | 0 | 1 | 1 | 1 | 1 | 1 | 1 | 2 |

In this example, each state in the TLC mode from the first pass is split into two states in the QLC mode (compare Table 2a with Table 2b), represented by "0" and "1" in the additional XP. After the second pass, the 16 states can be verified, where the "0" and "1" codes in the XP, UP, MP and LP can be determined after 8, 2, 3, 2 readings. In this 8-16 two-pass programming scheme, the codes in XP requires high number (eight) of readings. Additionally, the read margin for the 16 final states can be very narrow and can lead to high number of fail bit counts and read failures.

Figure 2:
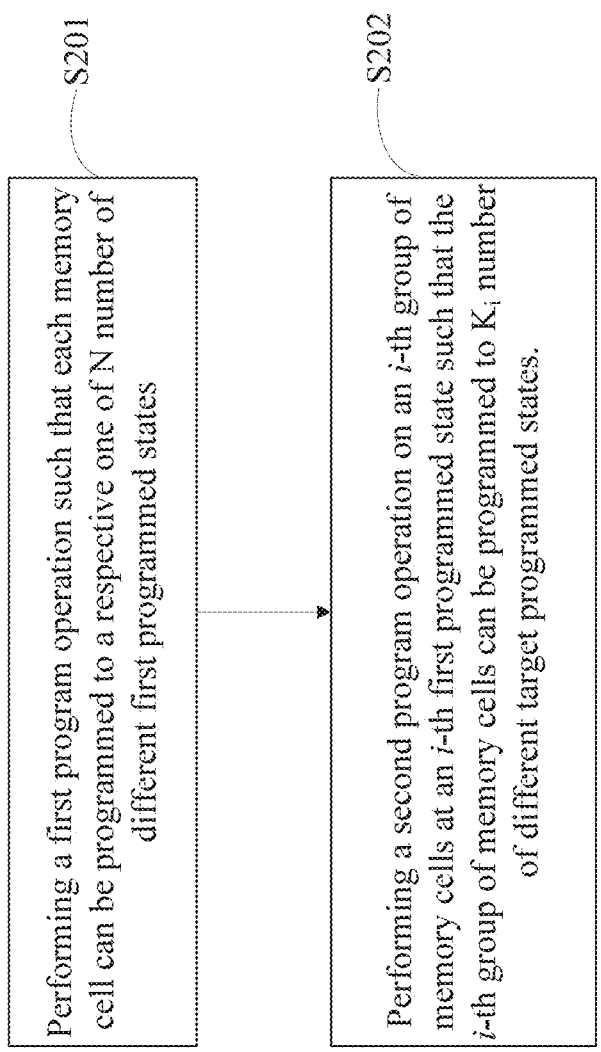
FIGS. 2 and 3 illustrate methods for performing program operations in a memory device, according to some implementations of the present disclosure.

FIG. 2 illustrates a method 200 for programming a memory device, according to some implementations of the present disclosure. It should be understood that the method 200 is not exhaustive and that other operation steps can be performed as well before, after, or between any of the illustrated operation steps. In some implementations, some operation steps of method 200 can be omitted or other operation steps can be included, which are not described here for simplicity. In some implementations, operation steps of method 200 can be performed in a different order and/or vary.

The method 200 includes step S201, where a first program operation can be performed on memory cells to be programmed (target memory cells). At the first program operation, each memory cell can be programmed to a respective one of N different first programmed states. Here, N is a positive integer greater than 1 and not more than M, and M is a total number of target programmed states of the memory cells to be programmed.

At step S202, a second program operation can be performed on an i-th group of memory cells at an i-th first programmed state. After the second program operation, the i-th group of memory cells at the i-th first programmed state can be programmed to $K_i$ different target programmed states. Here, i is greater than or equal to 1, and less than or equal to N, and $K_i$ is greater than or equal to 1 and not more than N. At least two groups of memory cells at two different first programmed states can be programmed to different numbers of target programmed states after the second program operation. For example, after the second program operation, a j-th group of memory cells at a j-th first programmed state can be programmed to $K_j$ different target programmed states. Here, j is greater than or equal to 1, and less than or equal to N, and $K_j$ is greater than or equal to 1 and not more than N. In some implementations, $K_i$ and $K_j$ are different numbers, i.e., $K_i \neq K_j$.

As described above, for a memory device configured in the nLC mode, the memory cells can be programmed from the erased state (ER or P0) to $2^n-1$ target programmed states P1, P2, . . . , P($2^n-1$). According to the method 200, after the first program operation, each memory cell can be programmed to one of N different first programmed states, where $1 \leq N \leq M$, and M is the total number of the target programmed states (i.e., $M=2^n-1$). In some implementations, after completing the first program operation, at least two memory cells with different target programmed states can be programmed into a same first programmed state. In some implementations, the first programmed states can be understood as intermediate or temporary states in the programming process. In some implementations, the first programmed states can be any logic states without correlation to the programming data or the target programmed states. However, in some implementations, the first programmed states can be defined by the programming data in certain manner.

For example, after the first program operation according to the method 200, the memory cells can be programmed to N number of first programmed states, $S_1, S_2, \ldots, S_N$, which can correspond to $K_1, K_2, \ldots, K_N$ number of the target programmed states respectively. In the other words, the memory cells to be programmed to $K_1$ number of different target programmed states can all be programmed to a same first programmed state $S_1$, and the memory cells to be programmed to $K_2$ number of different target programmed states can all be programmed to a same first programmed state $S_2$. The i-th first programmed state can correspond to the $K_1$ number of different target programmed states. The memory cells to be programmed to $K_N$ number of different target programmed states can all be programmed to a same first programmed state $S_N$. It is noted that the target programmed states within each group of the $K_1, K_2, \ldots, K_i, \ldots, K_N$ number of the target programmed states are different from each other. Additionally, the target programmed states between groups of the $K_1, K_2, \ldots, K_i, \ldots, K_N$ number of the target programmed states are also different from each other. Accordingly, the sum of $K_1, K_2, \ldots, K_i, \ldots,$ and $K_N$ is the total number of the target programmed states, i.e., $K_1+K_2+\ldots+K_N=M=2^n-1$.

As such, the second program operation can be carried out subsequently to program the memory cells at the N different first programmed states to the $2^n-1$ target programmed states. For example, the memory cells at the first programmed state $S_1$ after the first program operation can be programmed to $K_1$ number of different target programmed states during the second program operation. The memory cells at the first programmed state $S_2$ after the first program operation can be programmed to $K_2$ number of different target programmed states during the second program operation. Similarly, the memory cells at the first programmed state $S_N$ after the first program operation can be programmed to $K_N$ number of different target programmed states during the second program operation.

In the implementations disclosed in the present disclosure, a group of memory cells to be programmed to different target programmed states can be first programmed to a same first programmed state in the first program operation. As such, it takes less time to complete the first program operation. It is noted that the first programmed states described in the method 200 are in direct relationship with the target programmed states defined by the programming data. No separate Gray code mapping is used for the first program operation, which is different from the 8-16 two-pass programming scheme described in Table 2a and Table 2b. However, method 200 does not limit the use of Gray code for the first programmed states. Moreover, the balanced Gray code can be used to program and/or read for the second program operation. Using balanced Gray code at the second program operation can improve the read margin. With fewer read failure bit counts, data readability and reliability can also be improved.

Figure 3:
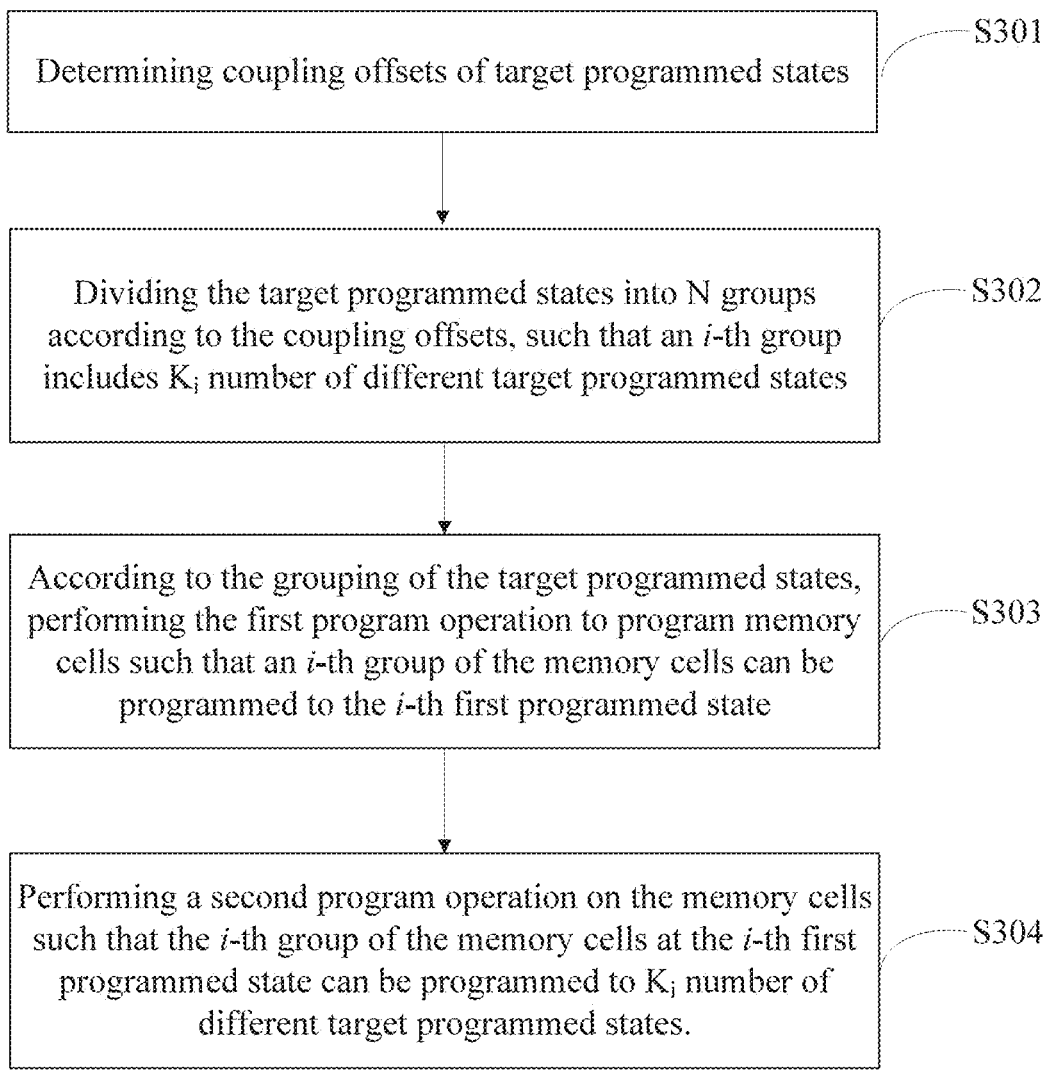

FIG. 3 illustrates a method 300 for programming a memory device, according to some implementations of the present disclosure. It should be understood that the method 300 is not exhaustive and that other operation steps can be performed as well before, after, or between any of the illustrated operation steps. In some implementations, some operation steps of method 300 can be omitted or other operation steps can be included, which are not described here for simplicity. In some implementations, operation steps of method 300 can be performed in a different order and/or vary. Method 300 can be similar to the method 200, where the difference will be described in detail below.

At step S301, before the first program operation, coupling offsets of the target programmed states can be predetermined. The coupling offset of a target programmed state can be determined from threshold voltage shifts of memory cells at the target programmed state affected by adjacent memory cells. A decrease in the threshold voltages of the memory cells is defined as a left shift, and an increase in the threshold voltages of the memory cells is defined as a right shift. Using memory cells with charge trapping as an example, trapped charges in a storage layer of a memory cell can be changed by trapped charges in storage layers of adjacent memory cells due to the effect of coupling capacitance. The coupling capacitance cam be inversely proportional to the distance between adjacent memory cells: the shorter the distance, the greater the coupling capacitance and thereby the greater a mutual influence. Therefore, a shift of the threshold voltage of the memory cell (i.e., a coupling offset) can be generated when programming adjacent memory cells. The coupling offset can change the threshold voltage distribution of the programmed states, which can cause a read failure during a read operation.

Table 3 illustrates exemplary coupling offsets of the programmed states in a TLC mode, according to some implementations of the present disclosure. As shown in Table 3, the memory cells in each of the seven programmed states (P1-P7) can be affected by adjacent memory cells. The coupling offsets depend on the programmed state of the adjacent memory cells. In Table 3, the first column represent the programmed state of target memory cells coupled to a selected word line (i.e., victim states), where the top row represents the programmed state of adjacent memory cells coupled to an adjacent word line. Generally, the higher the state (i.e., threshold voltage) of an adjacent memory cell, the greater the influence to the target memory cells and the greater the coupling offset. Additionally, the lower the state of the target memory cell, the greater the influence received from adjacent memory cells. And vice versa.

TABLE 3

| Coupling Offset (mV) | | Neighboring states | | | | | | |
|---|---|---|---|---|---|---|---|---|
| | | P0 | P1 | P2 | P3 | P4 | P5 | P6 P7 |
| Victim states | P1 | 2 | 19 | 31 | 45 | 66 | 92 | 126 183 |
| | P2 | −7 | 12 | 25 | 39 | 57 | 82 | 115 167 |
| | P3 | −10 | 7 | 22 | 33 | 53 | 75 | 103 153 |
| | P4 | −15 | 4 | 17 | 29 | 45 | 66 | 95 138 |
| | P5 | −17 | −2 | 12 | 21 | 38 | 58 | 82 122 |
| | P6 | −21 | −4 | 5 | 18 | 31 | 49 | 74 111 |
| | P7 | −24 | −11 | 1 | 12 | 25 | 42 | 66 100 |

In some implementations, the coupling offset of a target programmed state can be obtained by measuring the threshold voltage shift of a target memory cell programmed to the target programmed state relative to adjacent memory cells programmed to various states. The target memory cell can be addressed through a selected word line. In some implementations, the adjacent memory cells can be addressed through a neighboring word line.

The coupling offset depends on the structure of the memory device and can be affected by the manufacturing process, the number of bits (nLC mode), materials, etc. Different memory devices can have different coupling offset. In some implementations, the coupling offset can be determined at the product test in the factory, and can be characterized as an intrinsic attribute of a particular memory device.

In some implementations, the coupling offset can be determined through silicon testing. Taking a QLC memory device as an example, the tested memory cells (i.e., victim cells) can be programmed to a respective one of the states P1 to P15, and the adjacent memory cells can be at states P0 to P15. The tested memory cells are coupled to a selected word line and the adjacent memory cells are coupled to adjacent word lines. The shifts of threshold voltages of the tested memory cells affected by the states of the adjacent memory cells are the respective coupling offsets. Coupling offsets of different memory devices can also be obtained through the silicon test.

At step S302 of the method 300, the target programmed states can be divided (or classified) into N number of groups according to the coupling offsets, among which the i-th group includes $K_i$ number of different target programmed states ($1 \leq i \leq N$). For example, a first group includes $K_1$ number of different target programmed states, a second group includes $K_2$ number of different target programmed states, and so on. An i-th group includes $K_i$ number of different target programmed states. An N-th group includes $K_N$ number of different target programmed states. The sum of $K_1, K_2, \ldots, K_i, \ldots,$ and $K_N$ is the total number of the target programmed states, i.e., $K_1+K_2+\ldots+K_N=M=2^n-1$. Here, the N groups of the target programmed states are disjointed. Namely, any target programmed state does not appear in more than one of the N groups. Each of the target programmed states is included in one and only one of the N groups. In some implementations, at least two groups include different numbers of target programmed states. For example, between the i-th group and the j-th group, the number of target programmed states $K_i$ and $K_j$ are different ($K_i \neq K_j$).

The target programmed states to be programmed to each memory cell can be flexibly grouped. In some implementations, target programmed states having similar coupling offsets can be grouped together into a same group. By grouping one or more target programmed states with similar coupling offsets into a same intermediate state (first programmed state), not only can programming time be saved in the multi-pass programming, but also the coupling offsets of the target programmed states can be minimized after the second program operation is completed for all the memory cells.

In some implementations, adjacent target programmed states whose coupling offsets are within a predetermined range can be grouped to a same group. In some implementations, the predetermined range can be selected such that the target programmed states can be divided into the N groups, each group including a same number of the target programmed states, i.e., $K_1, K_2, \ldots, K_N$ are the same. In some implementations, one or more target programmed states with smaller coupling offsets can be grouped in a same group. In some implementations, one or more target programmed states with greater coupling offsets can be grouped in a same group. The predetermined range of coupling offsets for grouping the target programmed states can also follow other user-defined rules. For example, multiple predetermined ranges can be used to group the target programmed states.

In some implementations, target programmed states in the same group can be adjacent target programmed states. But adjacent target programmed states may not necessarily be in the same group. If coupling offsets of two adjacent target programmed states have a large difference, the two adjacent target programmed states can be classified or separated into two different groups. In some implementations, a target programmed state having a coupling offset exceeding the predetermined range can be classified into a separate group.

In some implementations, adjacent target programmed states whose coupling offsets are smaller than a first preset threshold can be classified as a first group. Adjacent target programmed states whose coupling offset is greater than or equal to the first preset threshold and smaller than a second preset threshold can be classified as a second group. Adjacent target programmed states whose coupling offsets are greater than or equal to the second preset threshold can be classified as a third group. In an implementation of the present disclosure, the first preset threshold can be smaller than the second preset threshold. It should be noted that the aforementioned first group, second group and third group are exemplary classification of the target programmed states. The N groups of the target programmed states is not limited to three, and can be any combination of the aforementioned first group, second group and third group. Also, the first preset threshold and the second preset threshold are used for illustration purpose. Multiple preset thresholds, such as a third preset threshold and a fourth preset threshold, can be used if needed. For example, the second group can be further divided according to the third preset threshold that is between the first preset threshold and the second preset threshold. After the classification, there can be one or more target programmed states in a group.

For example, shown in Table 3, the coupling offsets between any two adjacent memory cells in the TLC mode can range from 1 mV to 183 mV considering both left and right shift. If the first preset range is set to be less than 40 mV, states P1 and P2 can be grouped into the first group because the coupling offsets of states P1 and P2 influenced by states P0, P1 and P2 are less than 40 mV. If the second preset range is set to be less than 100 mV, states P3, P4 and P5 can be grouped into the second group because the coupling offsets of states P3, P4 and P5 influenced by states P0-P5 are less than 100 mV. And states P6 and P7 can be grouped into the third group because the coupling offset of states P6 and P7 influenced by states P0-P7 can be larger than 100 mV.

In some implementations, after coupling offsets are determined through silicon test at factory, Margin Loss test can be performed on the memory cells programmed to the target programmed states for each of possible classification schemes (e.g., 6 groups, 8 groups, 10 groups). The classification scheme with the least read margin loss can be set as default for the memory device.

In some implementations, a coupling offset ratio may also be used to divide the target programmed states into N groups the instead of the coupling offset. The coupling offset ratio of a target programmed state can be determined from a ratio of the coupling offset (e.g., the threshold voltage shift) to the threshold voltage associated with the target programmed state unaffected by the coupling capacitance effect. For the convenience of description, the coupling offset is used for description in the present disclosure, but the coupling offset ratio can be used similarly.

At step S303, according to the grouping of the target programmed states, performing the first program operation on the memory cells to be programmed so that the memory cells can be programmed to the first programmed states. Each of the first programmed states corresponds to a respective one of the N groups of the target programmed states. For example, the first programmed state $S_1$ corresponds to the first group that includes $K_1$ number of different target programmed states, and the second programmed state $S_2$ corresponds to the second group that includes $K_2$ number of different target programmed states, and so on. The i-th first programmed state $S_i$ corresponds to the i-th group that includes $K_i$ number of different target programmed states. The N-th first programmed state $S_N$ corresponds to the N-th group that includes $K_N$ number of different target programmed states. As such, the N number of first programmed states $S_1, S_2, \ldots, S_N$ are associated with the N groups of the target programmed states. In the other words, the first programmed states $S_1, S_2, \ldots, S_N$ can be determined by the target programmed states after considering the coupling offsets. Similar to the method 200, in method 300, the memory cells can be programmed to respective first programmed states $S_1, S_2, \ldots, S_N$ according to their respective target programmed states based on the programming data.

At step S304, the second program operation can be performed to program the memory cells to the target programmed states, similar to step S202 of the method 200. As a result, a subset of the memory cells at the i-th first programmed state can be programmed to $K_i$ number of different target programmed states.

In some implementations, the method 300 also includes, after performing the first program operation on all memory cells to be programmed, performing a first verification operation on each memory cell using first verification voltages associated with the first programmed states to determine whether each memory cell is programmed to a corresponding first programmed state. For the different target programmed states in a same group (i-th group), a same verification voltage can be used for the first verification operation (to verify the i-th first programmed state). That is, one first programmed state corresponds to one first verification voltage. The N different first programmed states can be verified using N different first verification voltages, respectively.

In some implementations, the threshold voltage of the memory cell increases during the second program operation because of extra programming pulses. The target programmed states can be higher than a corresponding first programmed state, where the associated threshold voltages of the target programmed states can also be higher than that of the first programmed state. In this example, the first verification voltage used to verify the first programmed state can be lower than second verification voltages corresponding to the target programmed states. As such, one first verification voltage can be used for verifying each group of the target programmed states, which can save verification time and improve the overall programming speed.

In some implementations, memory cells to be programmed to a same first programmed state can also be grouped together. The first program operation can be performed on a group of memory cells to be programmed onto a certain first programmed state, followed by the first verification operation. When all the memory cells in the group pass the verification, the first program operation can then be performed on a next group of memory cells to be programmed to another first programmed state followed by another first verification operation. As such, programming and verifying can be performed on memory cells group by group until all N groups of memory cells are programmed to respective N first programmed states.

In some implementations, the first program operation can be performed during each of multiple loops (e.g., a first set of loops), where after each programming, it can be determined whether to perform the first program operation in a subsequent loop based on verification results of the first verification operation. If the verification results indicate that the memory cells have been programmed to respective first programmed states, then the first program operation can be stopped. If the verification results indicate that the memory cells have not been programmed to respective first programmed states and thereby fail the first verification, the first program operation can proceed to a next loop to program those failed memory cells again until all the memory cells are programmed to respective N different first programmed states. Memory cells that pass the first verification can be inhibited from being programmed in a subsequent loop. In some implementations, the first program operation includes Incremental Step Pulse Programming (ISPP), where a program voltage $V_{pgm}$ applied to a selected word line coupled to target memory cells can be increased incrementally with a step pulse $V_{step}$ in each loop.

In some implementations, the method 300 also includes, after performing the second program operation on all memory cells to be programmed, performing a second verification operation on each memory cell using second verification voltages associated with the target programmed states to determine whether each memory cell is programmed to a corresponding target programmed state. Different second verification voltages can be used to verify the $K_i$ number of different target programmed states of the i-th group. In some implementations, the i-th group of the target programmed states can be verified by using $K_i$ number different second verification voltages. In some implementations, the first verification voltage used for verifying the i-th first programmed states can be smaller than any second verification voltages used for verifying the $K_i$ number of target programmed states.

Similar to the first program operation, in some implementations, the second program operation can also be performed during each of multiple loops (e.g., a second set of loops), and can also use the ISPP method. Also, during the second program operation, programming and verifying can be performed on memory cells group by group, until each group of memory cells are programmed to respective M ($2^n-1$) target programmed states. For example, the i-th group of memory cells programmed to the i-th first programmed state during the first program operation can be further split into $K_i$ number of sub-groups. During the second program operation, each sub-group of memory cells can be programmed to a respective target programmed state in the i-th group of target programmed states. The second verification operation can be performed after programming each of the $K_i$ number of sub-groups of memory cells. Alternatively, the second verification operation can be performed after programming all the $K_i$ number of sub-groups of memory cells.

Figure 4:
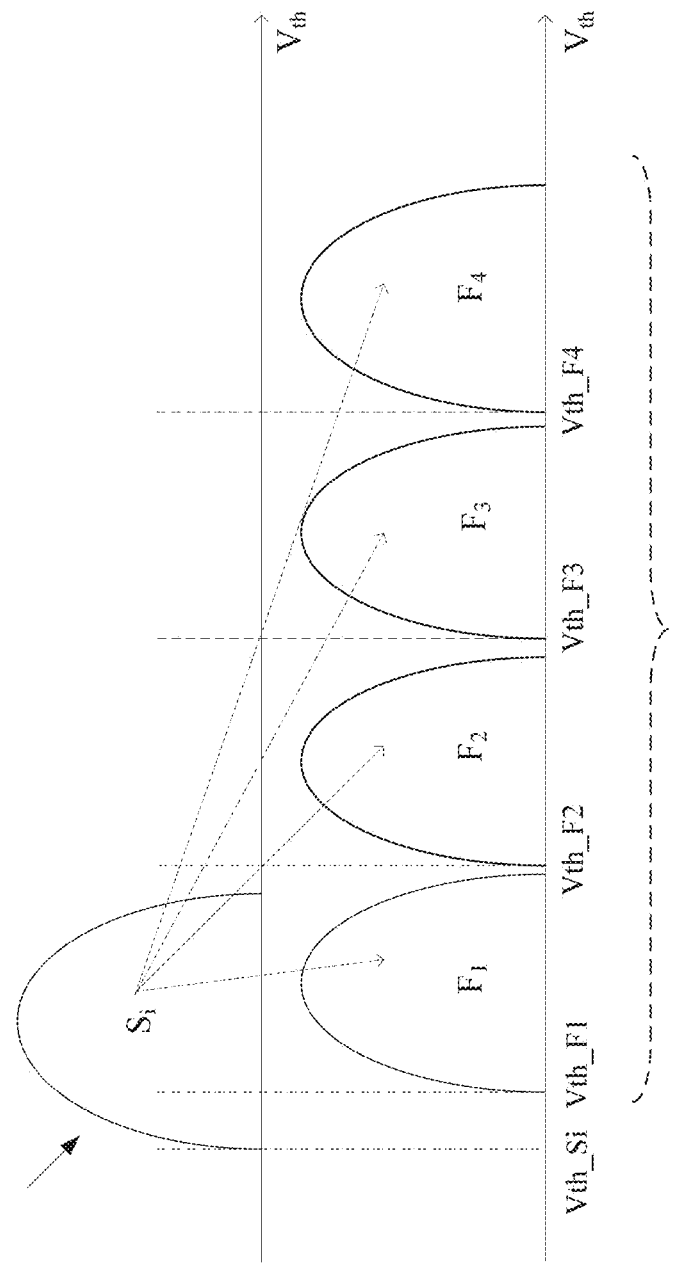
FIG. 4 illustrates threshold voltage distributions after performing a second program operation to an i-th first programmed state, according to some implementations of the present disclosure.

FIG. 4 illustrates an example of the multi-pass programming scheme 400, according to some implementations of the present disclosure. FIG. 4 shows threshold voltage distributions of the i-th first programmed state and the corresponding target programmed states of the i-th group according to method 300. In this example, four target programmed states F1, F2, F3 and F4 are grouped as the i-th group of target programmed states, i.e., $K_i=4$. The i-th first programmed state $S_i$ corresponds to the four target programmed states F1, F2, F3 and F4 in the i-th group. The memory cells to be programmed to the target programmed states F1, F2, F3 and F4 can be programmed to the first programmed state $S_i$ during the first program operation. A lower edge of the threshold voltage distribution of the first programmed state $S_i$ is $V_{th\_}Si$. After the second program operation, the memory cells at the first programmed state $S_i$ can be programmed to the target programmed states F1, F2, F3 or F4, respectively, which correspond to higher threshold voltages. As shown in FIG. 4, the lower edges of the threshold voltage distributions of the target programmed states F1, F2, F3 and F4 are $V_{th\_}F1$, $V_{th\_}F2$, $V_{th\_}F3$ and $V_{th\_}F4$, all higher than $V_{th\_}Si$. Because a lower verification voltage can be used to verify a lower state having a lower threshold voltage, the first verification voltage used for verifying the i-th first programmed state $S_i$ can be lower than any second verification voltages used for verifying the four target programmed states F1-F4.

It is noted that the lower edge $V_{th\_}Si$ of the first programmed state $S_i$ is lower than the lower edge $V_{th\_}F1$ of the target programmed state F1 which is the lowest among the i-th group of target programmed states. Thus, during the first program operation, the program voltages applied to the selected word line need to be controlled to avoid over-programming the i-th first programmed state $S_i$ and to ensure the lower edge $V_{th\_}Si$ not to go above the lower edge $V_{th\_}F1$.

In the example of FIG. 4, during the second program operation, a maximum threshold voltage offset between the i-th first programmed state $S_i$ and the highest target programmed state F4 in the i-th group can be expressed as $V_{th\_}F4-V_{th\_}Si+W\_Vth\_F4$, where $W\_Vth\_F4$ is the width of the threshold voltage distribution of the target programmed state F4. A total threshold voltage offset between the first programmed state and the target programmed state can also include the coupling offset between adjacent memory cells.

Table 4 illustrates an example of the multi-pass programming scheme, according to some implementation of the present disclosure. In this example, the memory device is configured in the QLC mode, where each memory cell can have 16 states P0-P15. The target programmed states P1-P15 can be divided into 9 groups. The first group includes states P1, P2 and P3. The second group includes states P4 and P5. The third group includes states P6 and P7. The fourth group includes states P8 and P9. The fifth group includes states P10 and P11. The sixth group includes state P12. The seventh group includes state P13. The eighth group includes state P14, and the ninth group includes state P15. In some implementations, the 9 groups are classified according to the coupling offset between adjacent memory cells. The target programmed states with similar coupling offsets can be grouped together. Memory cells at higher states (e.g., states P14, P15) can induce larger coupling offsets in adjacent memory cells and thereby can be grouped separately from lower states or form a group with a single state. In Table 4, balanced Gray code is used for mapping the target programmed states to improve the read speed and the read margin.

TABLE 4

| | first programmed states | | | | | | | | | | | | | | | |
|---|---|---|---|---|---|---|---|---|---|---|---|---|---|---|---|---|
| | S0 | S1 | | S2 | | S3 | | S4 | | S5 | | S6 | S7 | S8 | S9 | |
| | target programmed states | | | | | | | | | | | | | | | |
| | P0 | P1 | P2 | P3 | P4 | P5 | P6 | P7 | P8 | P9 | P10 | P11 | P12 | P13 | P14 | P15 |
| XP | 1 | 1 | 0 | 0 | 0 | 0 | 0 | 0 | 1 | 1 | 1 | 1 | 1 | 1 | 0 | 0 |
| UP | 1 | 1 | 1 | 1 | 1 | 0 | 0 | 0 | 0 | 0 | 1 | 1 | 0 | 0 | 0 | 1 |
| MP | 1 | 1 | 1 | 0 | 0 | 0 | 0 | 1 | 1 | 0 | 0 | 0 | 0 | 1 | 1 | 1 |
| LP | 1 | 0 | 0 | 0 | 1 | 1 | 0 | 0 | 0 | 0 | 0 | 1 | 1 | 1 | 1 | 1 |

After the target programmed states are divided into 9 groups, the first program operation can be performed on the memory cells to be programmed. For example, memory cells to be programmed to the first group of target programmed states P1-P3 can be programmed to the first programmed state S1. The threshold voltage of the first programmed state S1 can be lower than the threshold voltages of the target programmed states P1, P2 and P3. A first verification voltage can be used after in the first program operation to verify whether the memory cells are programmed to the first programmed state S1. The time required for the first program operation here can be shorter than that of the 16-16 two-pass programming scheme because memory cells to be programmed to the target programmed states P1-P3 are programmed to the same first programmed state S1 using the same program voltage. In the 16-16 two-pass programming scheme, during the first program operation, memory cells are programmed to 16 different first programmed states having threshold voltages slightly lower than corresponding 16 target programmed states.

After all the memory cells are programmed to respective first programmed states S1-S9, the second program operation can be performed to program the memory cells to a respective target programmed states P1-P15. For example, memory cells at the first programmed state S1 can be programmed to the target programmed states P1, P2 or P3, respectively.

Table 5 illustrates another example of the multi-pass programming scheme, according to some implementation of the present disclosure. In this example, the 15 target programmed states P1-P15 of the QLC mode can be divided into 5 groups, where the first group includes states P1-P4, the second group includes states P5-P8, the third group includes states P9-P11, the fourth group includes states P12-P13, and the fifth group includes states P14-P15. Here, balanced Gray code can be used to map the target programmed states so that flip counts and number of reading for each logic page can be similar (balanced) to avoid congestion or overload at a certain logic page. As such, number of failed bits can be minimized.

After the target programmed states P1-P15 are divided into 5 groups, the first program operation can be performed to program the memory cells to the first programmed states S1-S5, respectively. For example, memory cells to be programmed to the first group of the target programmed states P1-P4 can be programmed to the first programmed state S1 during the first program operation. After the first program operation, first verification voltages can be used to verify whether the memory cells have been programmed to the first programmed states S1-S5. For example, a same first verification voltage can be used for memory cells to be programmed to the target programmed states P1-P4 after the first program operation to verify whether these memory cells have been programmed to the same first programmed state S1. The first programmed state S1 corresponds to a threshold voltage lower than the threshold voltages of the target programmed states P1-P4. The first verification voltage used for verifying the first programmed state S1 can also be lower than second verification voltages used for verifying the target programmed states P1-P4. Compared to the 16-16 two-pass programming scheme, programming memory cells to a same first programmed state for a group of target programmed states can save time.

Then, the second program operation can be performed on the memory cells at the first programmed states S1-S5 to the target programmed states P1-P15, respectively, according to the grouping of the target programmed states. For example, memory cells at the first programmed state S1 can be programmed to the target programmed states P1-P4, respectively, for the first group.

Implementations of the programming method disclosed in the present disclosure may have one or more of the following benefits:

1. saving time at the first-pass by grouping multiple target programmed states into one first programmed state for the first program operation.
2. improving read margin and read accuracy compared with the 8-16 two-pass programming scheme by using the balanced Gray code for mapping the logic states.

TABLE 5

| | first programmed states | | | | | | | | | | | | | | | |
|---|---|---|---|---|---|---|---|---|---|---|---|---|---|---|---|---|
| | S0 | S1 | | | S2 | | | S3 | | | S4 | | | S5 | | |
| | target programmed states | | | | | | | | | | | | | | | |
| | P0 | P1 | P2 | P3 | P4 | P5 | P6 | P7 | P8 | P9 | P10 | P11 | P12 | P13 | P14 | P15 |
| XP | 1 | 1 | 0 | 0 | 0 | 0 | 0 | 0 | 1 | 1 | 1 | 1 | 1 | 1 | 0 | 0 |
| UP | 1 | 1 | 1 | 1 | 1 | 0 | 0 | 0 | 0 | 0 | 1 | 1 | 0 | 0 | 0 | 1 |
| MP | 1 | 1 | 1 | 0 | 0 | 0 | 0 | 1 | 1 | 0 | 0 | 0 | 0 | 1 | 1 | 1 |
| LP | 1 | 0 | 0 | 0 | 1 | 1 | 0 | 0 | 0 | 0 | 0 | 1 | 1 | 1 | 1 | 1 |

3. achieving similar read margin if using similar Gray code as that in the 8-16 two-pass programming scheme.
4. avoid remapping Gray code at the first program operation by using the Gray code of the target programmed states directly.
5. completing all the required operations within a memory die without resorting to other additional operations outside the memory die.

Figure 5:
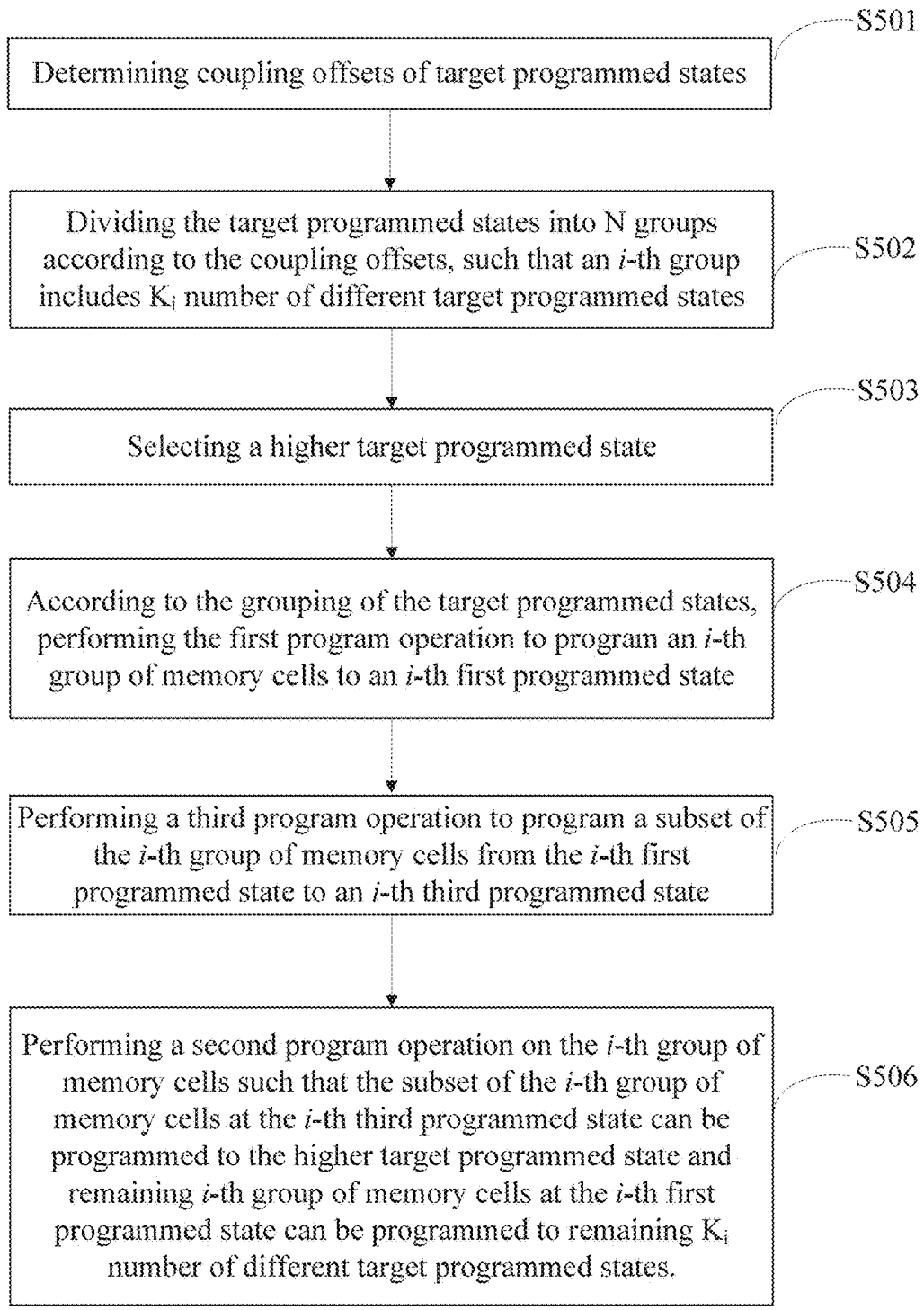
FIG. 5 illustrate methods for performing program operations in a memory device, according to some implementations of the present disclosure.

FIG. 5 illustrates a method 500 for programming a memory device, according to some implementations of the present disclosure. It should be understood that the method 500 is not exhaustive and that other operation steps can be performed as well before, after, or between any of the illustrated operation steps. In some implementations, some operation steps of method 500 can be omitted or other operation steps can be included, which are not described here for simplicity. In some implementations, operation steps of method 500 can be performed in a different order and/or vary. Method 500 can be similar to the method 300, where the difference will be described in detail below.

At step S501, similar to the step 301 of method 300, the coupling offsets of the target programmed states can be determined.

At step S502, similar to the step 302 of method 300, the target programmed states can be divided into N groups according to the respective coupling offsets, where an i-th group includes $K_i$ number of different target programmed states.

At step S503, a higher target programmed state can be selected. In some implementations, the higher second programmed state can have a higher threshold voltage compared with other second programmed states in a same group of target programmed states. The higher second programmed state can be, for example, shown in Table 4, states P2 and/or P3 in the first group of target programmed states (corresponding to the first programmed state S1), states P5 in the second group (corresponding to the first programmed state S2), states P7 in the third group (corresponding to the first programmed state S3), state P9 in the fourth group (corresponding to the first programmed state S4), and state P11 in the fifth group (corresponding to the first programmed state S5). As shown in Table 5, the higher second programmed state can be, for example, states P3 and/or P4 in the first group (corresponding to the first programmed state S1), states P7 and/or P8 in the second group (corresponding to the first programmed state S2), states P11 in the third group (corresponding to the first programmed state S3), state P13 in the fourth group (corresponding to the first programmed state S4), and state P15 in the fifth group (corresponding to the first programmed state S5).

In some implementations, the higher target programmed state can have a higher threshold voltage compared with other second programmed states in other groups of target programmed states. In some implementations, the higher second programmed state can be a single target programmed state after the division at step S502 and is associated with a higher first programmed state in one-to-one correlation. In some implementations, the higher second programmed state can be, for example, states P12, P13, P14 and/or P15 in Table 4 corresponding to the higher first programmed states S6, S7, S8 and/or S9, respectively. The higher second programmed state can be, for example, states P12, P13, P14 and/or P15 in Table 5 corresponding to the first programmed states S4 and/or S5.

At step S504, similar to the step S303 in method 300, according to the grouping of the target programmed states, the first program operation can be performed to the memory cells to be programmed, where an i-th group of memory cells can be programmed to an i-th first programmed state.

At step S505, a third program operation (also referred to as "further program operation") can be performed on memory cells to be programmed to the higher target programmed state selected at step S503. For example, a subset of the i-th group of memory cells can be programmed from the i-th first programmed state to an i-th third programmed state, where the i-th third programmed state can have a higher threshold voltage than the i-th first programmed state and the i-th third programmed state corresponds to the higher target programmed state.

At step S506, similar to the step S304 of method 300, the second program operation can be performed to program the memory cells to respective target programmed states. Different from the method 300, in method 500, when programming the i-th group of memory cells, the subset of the i-th group of memory cells at the i-th third programmed state can be programmed to the higher target programmed state and remaining i-th group of memory cells at the i-th first programmed state can be programmed to remaining $K_i$ number of different target programmed states.

In some implementations, the higher target programmed state can have a higher threshold voltage compared with other second programmed states in a same group of target programmed states. For example, in Table 4, the higher second programmed state can be selected at the step S503 to be states P2 and/or P3 in the first group of target programmed states, states P5 in the second group, states P7 in the third group, state P9 in the fourth group, and state P5 in the fifth group. Within each group of the target programmed states, a third programmed state (e.g., S1') can be created from a respective first programmed state (e.g., S1) during the third program operation at the step S505. During the second programmed operation at the step S506, memory cells at the first programmed state (e.g., S1) and the third programmed state (e.g., S1') can be programmed to respective second programmed states (e.g., S1 to P1 and S1' to P2/P3) in the group (e.g., the first group). Similarly, in Table 5, the higher second programmed state can be selected to be P3 and/or P4 in the first group of target programmed states, states P7 and/or P8 in the second group, states P11 in the third group, state P13 in the fourth group, and state P15 in the fifth group. Within each group of the target programmed states, a third programmed state (e.g., S2') can be created from a respective first programmed state (e.g., S2) during the third program operation. During the second programmed operation, memory cells at the first programmed state (e.g., S2) and the third programmed state (e.g., S2') can be programmed to respective second programmed states (e.g., S2 to P5/P6 and S2' to P7/P8) in the group (e.g., the second group).

In some implementations, in Table 4, the higher second programmed state can be selected at the step S503 to be states P12, P13, P14 and/or P15. Here, the higher second program state (e.g., P14) correspond to a single target programmed state in a group (e.g., the 8-th group). In some implementations, the higher second program state (e.g., P14) correspond to a higher first programmed state (e.g., S8). During the third program operation at the step S505, a third programmed state (e.g., S8') can be created from the higher first programmed state (e.g., S8). Memory cells (e.g., all the 8-th group of memory cells) programmed to the higher first programmed state (e.g., S8) can be programmed to the third programmed state (e.g., S8'). During the second programmed operation, memory cells at the third programmed states (e.g., S8') can be programmed to respective second programmed states (e.g., P14). In the other words, the first programmed state S8 in Table 4 can be shifted to the third programmed state S8' during the third program operation, and the third programmed state S8' can be shifted to the target programmed state P14 during the second program operation. Similarly, in Table 5, the higher second programmed states can be states P12/P13 and P14/P15, corresponding to the higher first programmed states S4 and S5, respectively. During the third program operation, memory cells at the higher first programmed state (e.g., S5) can be programmed to the third programmed state (e.g., S5'), and during the second program operation the memory cells at the third programmed state (e.g., S5') can be programmed to the respective higher target programmed states (e.g., P14 and P15).

Figure 6:
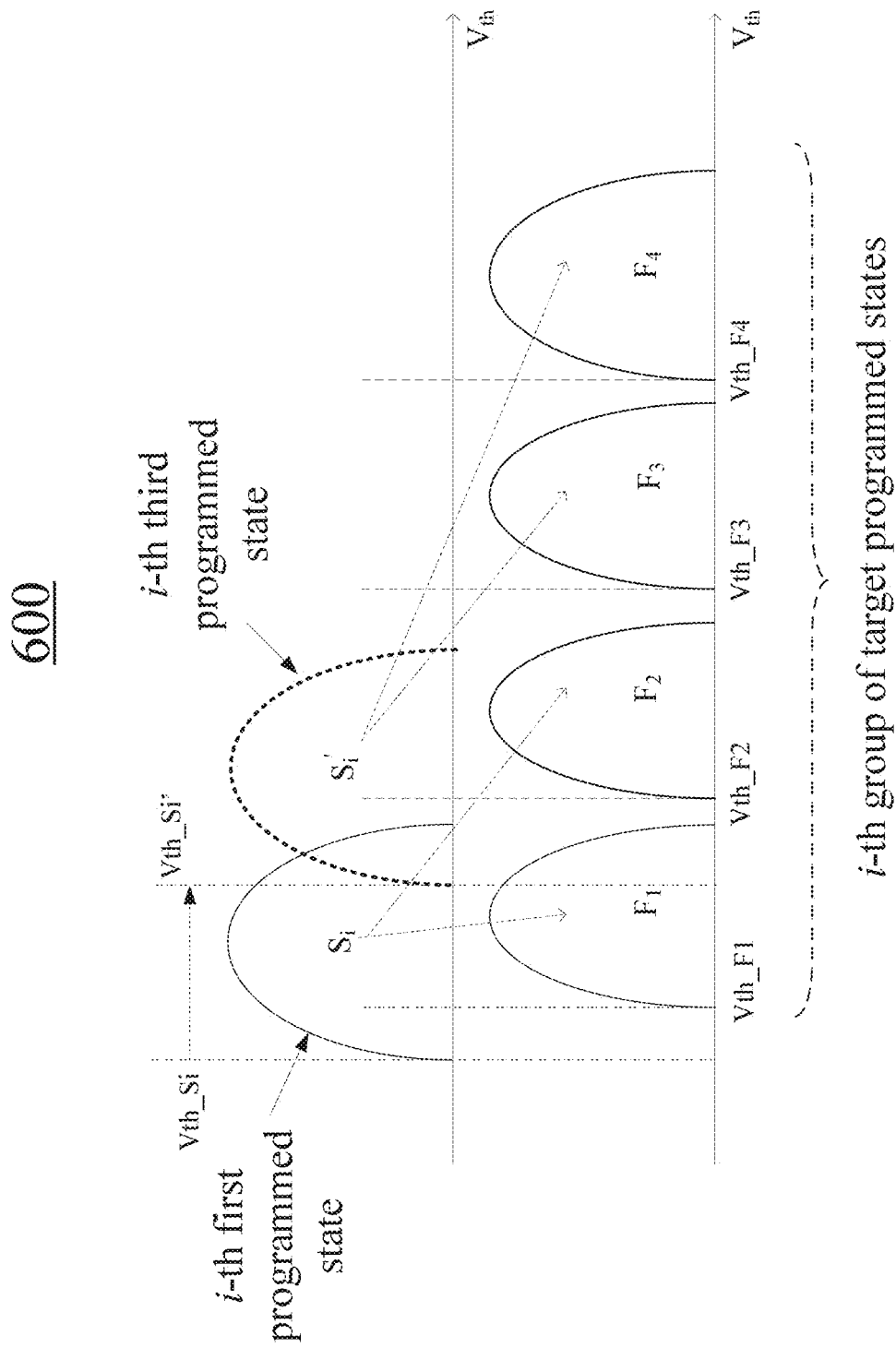
FIGS. 6 and 7 illustrate different multi-pass programming schemes for programming memory cells to an first programmed state and then to corresponding target programmed states, according to some implementations of the present disclosure.

FIG. 6 illustrates a multi-pass programming scheme 600, according to some implementations of the present disclosure. The multi-pass programming scheme 600 can be similar to the method 500 shown in FIG. 5, where FIG. 6 provides the threshold voltage distributions for a group of the second programmed states and corresponding first programmed state and third programmed states.

According to the multi-pass programming scheme 600, after the memory cells have been programmed to the N number of first programmed states through the first program operation and have been verified through the first verification operation, a third program operation can be performed on a subset of the memory cells to be programmed to a higher target programmed state among each group of the target programmed states. For example, after the first program operation, the i-th group of memory cells can be programmed to the i-th first programmed state S1 that corresponds to the i-th group of target programmed states. Different from the methods 200 and 300 and the multi-pass programming scheme 400, before performing the second program operation, the third program operation can be performed to program a subset of the i-th group of memory cells to a third programmed state $S_i'$, where the third programmed state $S_i'$ can be higher than the first programmed state $S_i$, i.e., corresponding to larger threshold voltages. For example, a lower edge Vth_Si' of the threshold voltage distribution of the third programmed state $S_i'$ can be higher than the lower edge Vth_Si of the first programmed state $S_i$. Next, during the second program operation, the subset of the i-th group of memory cells at the third programmed state $S_i'$ can be programmed to the target programmed states F3 and F4, while remaining memory cells in the i-th group can be programmed to the target programmed states F1 and F2. Shown in FIG. 6, among the i-th group of target programmed states, states F3 and F4 are higher than states F1 and F2.

In some implementations, a program voltage used in the third program operation can be similar to the step pulse $V_{step}$ used in the ISPP scheme. In some implementations, a verification operation can be performed or omitted after the third program operation.

By using the additional third program operation, the coupling effect between adjacent word lines can be reduced when programming with a multi-pass programming scheme. In some implementations, the first program operation can be performed on the memory cells coupled to a first word line. After verifying the memory cells coupled to the first word line have been successfully programmed to the first programmed states, the first program operation can be performed on the memory cells coupled to a second word line adjacent to the first word line. After verifying the memory cells coupled to the second word line have been successfully programmed to the first programmed states, the second program operation can be performed on the memory cells coupled to the first word line, followed by the second program operation performed on the memory cells coupled to the second word line. As such, multi-pass programming can be performed alternatingly on the memory cells coupled to adjacent word lines. However, when performing the second program operation on the memory cells coupled to the first word line, a higher program voltage can be used for a higher target programmed state. Therefore, the memory cells coupled to the second word line can be prone to the capacitance coupling effect from the memory cells coupled to the second word line. By using at least one additional program voltage (during the third program operation) after the first program operation and the first verification operation, memory cells to be programmed to the higher target programmed state (e.g., F3 or F4) can be programmed to the third programmed state (e.g., $S_i'$) that is higher than the first programmed state (e.g., $S_i$). As such, during the second program operation, a lower program voltage can be used to program the memory cells from the third programmed state (e.g., Si') to the higher target programmed state (e.g., F3 or F4). Similarly, for each group having two or more target programmed states, a subset of memory cells can be programmed from the first programmed state to the third programmed state higher than the first programmed state, and from the third programmed state to the target programmed state. By using additional program operation between the first program operation and the second program operation, program voltage for the target programmed state can be reduced during the second program operation. Thus, the capacitance coupling effect between adjacent word lines can be improved for the multi-pass programming scheme.

In some implementations, the third program operation can be performed after the first program operation and the first verification operation have been performed for all the first programmed states. In some implementations, the third program operation can be performed after the first program operation and the first verification operation have been performed for each of the first programmed states or a certain first programmed state.

In the example of FIG. 6, the third programmed state $S_i'$ corresponds to two target programmed states F3 and F4. It is noted that the scope of the present disclosure is not limited to 1-2 correspondence between the third programmed state and the target programmed states. For example, the third programmed state $S_i'$ can correspond to 1, 2, 3 . . . or any suitable number of target programmed states within $K_i$ number of target programmed states in the i-th group.

Figure 7:
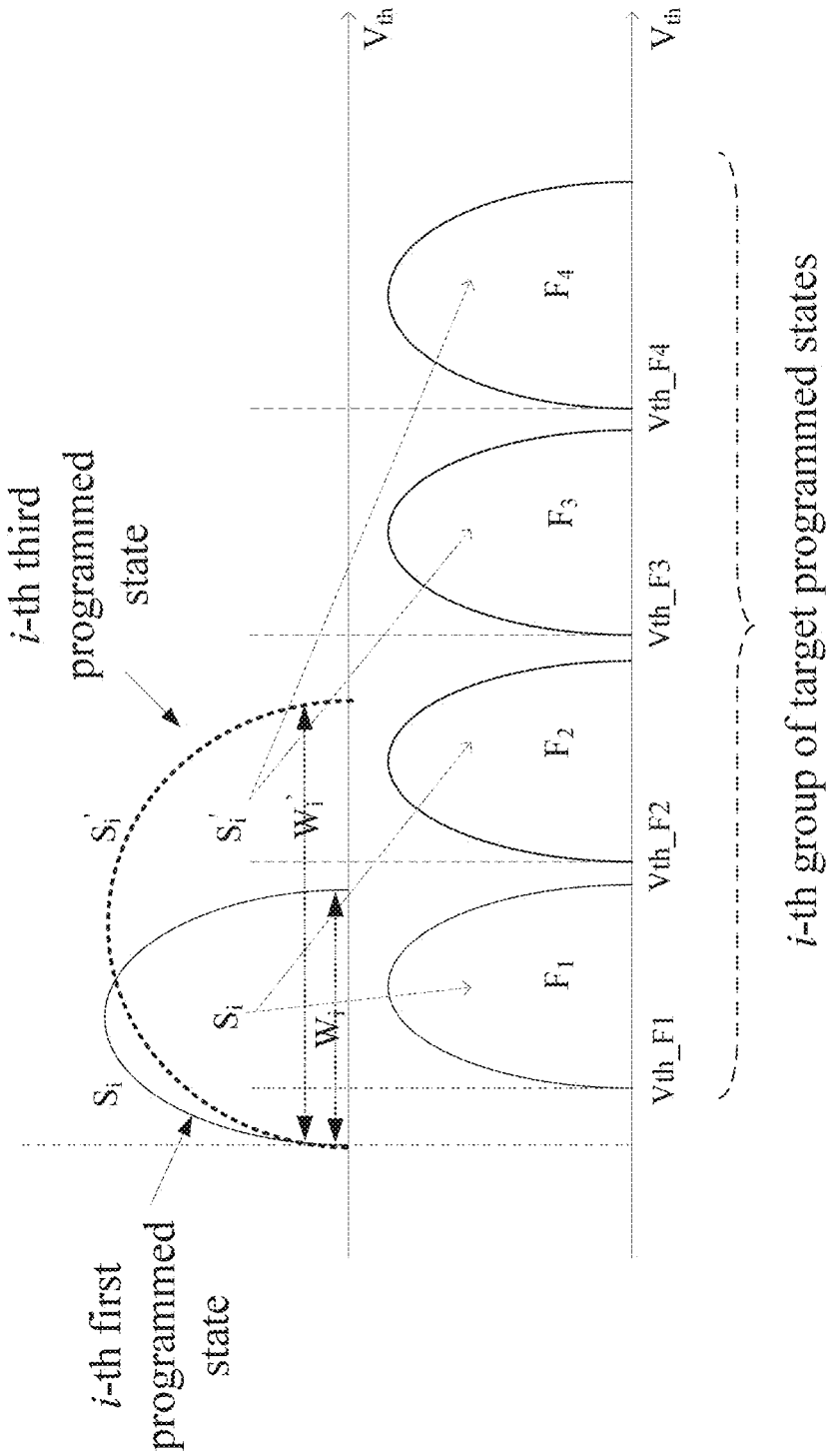

FIG. 7 illustrates a multi-pass programming scheme 700, according to some implementations of the present disclosure. The multi-pass programming scheme 700 can be similar to the multi-pass programming scheme 600 in FIG. 6. Different from the multi-pass programming scheme 600, the third programmed states, according to the multi-pass programming scheme 700, do not necessarily have higher threshold voltages than the corresponding first programmed states after the third program operation. Rather, the third programmed states have wider threshold voltage distributions than the corresponding first programmed states.

According to the multi-pass programming scheme 700, after the memory cells have been programmed to the N number of first programmed states through the first program operation and have been verified through the first verification operation, a third program operation can be performed on a subset of the memory cells to be programmed to a higher target programmed state among each group of the target programmed states. For example, after the first program operation, the i-th group of memory cells can be programmed to the i-th first programmed state $S_i$ that corresponds to the i-th group of target programmed states. Different from the multi-pass programming scheme 600, before performing the second program operation, the third program operation can be performed to program a subset of the i-th group of memory cells to a third programmed state $S_i'$, where the third programmed state $S_i'$ can have wider threshold voltage distribution than the first programmed state $S_i$. For example, a width $W_i'$ of the threshold voltage distribution of the third programmed state $S_i'$ can be larger than a width $W_i$ of the first programmed state $S_i$. Next, during the second program operation, the subset of the i-th group of memory cells at the third programmed state $S_i'$ can be programmed to the target programmed states F3 and F4, while remaining memory cells in the i-th group can be programmed to the target programmed states F1 and F2. Shown in FIG. 7, among the i-th group of target programmed states, states F3 and F4 are higher than states F1 and F2.

According to the multi-pass programming scheme 700, by using at least one additional program voltage (during the third program operation) after the first program operation and the first verification operation, memory cells to be programmed to the higher target programmed state (e.g., F3 or F4) can be programmed to the third programmed state (e.g., $S_i'$) that has wider threshold voltage distribution than the first programmed state (e.g., $S_i$). As such, during the second program operation, a lower program voltage can be used to program the memory cells from the third programmed state (e.g., Si') to the higher target programmed state (e.g., F3 or F4). Similarly, for each group having two or more target programmed states, a subset of memory cells can be programmed from the first programmed state to the third programmed state having wider threshold voltage distribution than the first programmed state, and from the third programmed state to the target programmed state. By using additional program operation between the first program operation and the second program operation, program voltage for the target programmed state can be reduced during the second program operation. Thus, the capacitance coupling effect between adjacent word lines can be improved for the multi-pass programming scheme.

In the example of FIG. 7, the third programmed state $S_i'$ corresponds to two target programmed states F3 and F4. It is noted that the scope of the present disclosure is not limited to 1-2 correspondence between the third programmed state and the target programmed states. For example, the third programmed state $S_i'$ can correspond to 1, 2, 3 . . . or any suitable number of target programmed states within $K_i$ number of target programmed states in the i-th group.

In summary, the present disclosure provides a method for programming a memory device. The method includes performing a first program operation on memory cells to be programmed such that each of the memory cells is programmed to a respective one of N different first programmed states, where N is a positive integer greater than 1 and less than M; and M is a total number of target programmed states of the memory cells. The method also includes performing a second program operation to program an i-th group of the memory cells at an i-th first programmed state to $K_i$ number of different target programmed states, where $K_i$ is greater than or equal to 1 and less than N; i is greater than or equal to 1, and less than or equal to N; and at least two first programmed states correspond to different k values.

In some implementations, the method also includes dividing the target programmed states into N groups that correspond to the N different first programmed states based on coupling offsets of the target programmed states during the programming, where an i-th group of the target programmed states has the $K_i$ number of the target programmed states.

In some implementations, the performing of the first program operation comprises performing the first program operation according to the N groups of target programmed states, wherein each of the memory cells is programmed to the respective one of the N different first programmed states according to the N groups.

In some implementations, the method also includes grouping adjacent target programmed states in a same group when the coupling offsets of the adjacent target programmed states are within a predetermined range.

In some implementations, the method also includes grouping a first group of adjacent target programmed states, whose coupling offsets are less than a first preset threshold value, into the first group; grouping a second group of adjacent target programmed states, whose coupling offsets are greater than or equal to the first preset threshold value but less than a second preset threshold value, into the second group; and grouping a third group of adjacent target programmed states, whose coupling offsets are greater than or equal to the second preset threshold value, into the third group.

In some implementations, the method also includes determining the coupling offsets of the target programmed states by measuring changes of threshold voltages of the memory cells coupled to a selected word line influenced by threshold voltages of memory cells coupled to an adjacent word line.

In some implementations, the method also includes, after performing the first program operation, performing a first verification operation to determine whether each of the memory cells is programmed to a respective first programmed state.

In some implementations, the method also includes performing the first program operation on the memory cells during each of one or more loops; after each of the one or more loops, determining whether to proceed to a next loop according to results of the first verification operation; stopping the first program operation if the results show that the memory cells pass the first verification operation; and proceeding to the next loop until each of the memory cells is programmed to the respective one of N different first programmed states.

In some implementations, the method also includes verifying the N different first programmed states using N different first verification voltages.

In some implementations, the method also includes, after performing the second program operation, performing a second verification operation to determine whether each of the memory cells is programmed to a respective target programmed state, where different second verification voltages are used to verify the $K_i$ number of different target programmed states.

In some implementations, an i-th first verification voltage used to verify the i-th first programmed state is smaller than any of the second verification voltages used to verify the $K_i$ number of target programmed states in the i-th group.

In some implementations, the method also includes programming the memory cells in a triple-level cell (TLC) mode, wherein each of the memory cells has 8 states; or programming the memory cells in a quad-level cell (QLC) mode, wherein each of the memory cells has 16 states.

The present disclosure also provides a method for programming a memory device. The method includes performing a first program operation to program memory cells of the memory device to first programmed states, where each of the first programmed states corresponds to a group of target programmed states, and at least two groups have different numbers of the target programmed states; performing a further program operation on a subset of the memory cells at a selected first programmed state, where the selected first programmed state corresponds to a selected target programmed state; and performing a second program operation to program the subset of the memory cells to the selected target programmed state, and to program remaining memory cells to remaining target programmed states according to the correspondence between each of the first programmed states and a respective group of the target programmed states.

In some implementations, the method also includes dividing the target programmed states into different groups based on coupling offsets of the target programmed states during the programming.

In some implementations, the method also includes grouping adjacent target programmed states in a same group when the coupling offsets of the adjacent target programmed states are within a predetermined range.

In some implementations, the method also includes determining the coupling offsets of the target programmed states by measuring changes of threshold voltages of the memory cells coupled to a selected word line influenced by threshold voltages of memory cells coupled to an adjacent word line.

In some implementations, the method also includes selecting the selected target programmed state from the target programmed states, where the selected target programmed state has a higher threshold voltage than other target programmed states within a same group.

In some implementations, the method also includes selecting the selected target programmed state from the target programmed states, where the selected target programmed state has a higher threshold voltage than any target programmed state in another group.

In some implementations, the method also includes performing the first program operation during each of a first set of loops; and performing the second program operation during each of a second set of loops, where a program voltage is increased incrementally in each of the first set of loops and/or in each of the second set of loops.

In some implementations, the method also includes performing a first verification operation after the first program operation to verify whether each of the memory cells is at a respective first programmed state; and performing a second verification operation after the second program operation to verify whether each of the memory cells is at a respective second programmed state.

In some implementations, the method also includes programming the memory cells in a quad-level cell (QLC) mode, where each of the memory cells has 16 states.

The present disclosure further provides a memory device, which includes a memory array comprising memory cells; and a peripheral circuit coupled to the memory array. The peripheral circuit is configured to perform a first program operation on the memory cells to be programmed such that each of the memory cells is programmed to a respective one of N different first programmed states, where N is a positive integer greater than 1 and less than M; and M is a total number of target programmed states of the memory cells. The peripheral circuit is further configured to perform a second program operation to program an i-th group of the memory cells at an i-th first programmed state to $K_i$ number of the target programmed states, where $K_i$ is greater than or equal to 1 and less than N; i is greater than or equal to 1, and less than or equal to N; and at least two first programmed states correspond to different k values.

In some implementations, the peripheral circuit is further configured to divide the target programmed states into N groups that correspond to the N different first programmed states based on coupling offsets of the target programmed states during the programming, where an i-th group of the target programmed states has the $K_i$ number of the target programmed states.

In some implementations, the peripheral circuit is further configured to perform the first program operation according to the N groups of target programmed states, where each of the memory cells is programmed to the respective one of the N different first programmed states according to the N groups.

In some implementations, the peripheral circuit is further configured to group adjacent target programmed states in a same group when the coupling offsets of the adjacent target programmed states are within a predetermined range.

In some implementations, the peripheral circuit is further configured to group a first group of adjacent target programmed states, whose coupling offsets are less than a first preset threshold value, into the first group; group a second group of adjacent target programmed states, whose coupling offsets are greater than or equal to the first preset threshold value but less than a second preset threshold value, into the second group; and group a third group of adjacent target programmed states, whose coupling offsets are greater than or equal to the second preset threshold value, into the third group.

In some implementations, the peripheral circuit is further configured to determine the coupling offsets of the target programmed states by measuring changes of threshold voltages of the memory cells coupled to a selected word line influenced by threshold voltages of memory cells coupled to an adjacent word line.

In some implementations, the peripheral circuit is further configured to perform a first verification operation to determine whether each of the memory cells is programmed to a respective first programmed state after performing the first program operation.

In some implementations, the peripheral circuit is further configured to perform the first program operation on the memory cells during each of one or more loops; after each of the one or more loops, determine whether to proceed to a next loop according to results of the first verification operation; stop the first program operation if the results show that the memory cells pass the first verification operation; and proceed to the next loop until each of the memory cells is programmed to the respective one of N different first programmed states.

In some implementations, the peripheral circuit is further configured to verify the N different first programmed states using N different first verification voltages.

In some implementations, the peripheral circuit is further configured to perform a second verification operation, after performing the second program operation, to determine whether each of the memory cells is programmed to a respective target programmed state, wherein different second verification voltages are used to verify the $K_i$ number of different target programmed states.

In some implementations, an i-th first verification voltage used to verify the i-th first programmed state is smaller than any of the second verification voltages used to verify the $K_i$ number of target programmed states in the i-th group.

In some implementations, the peripheral circuit is further configured to program the memory cells in a triple-level cell (TLC) mode, wherein each of the memory cells has 8 states; or program the memory cells in a quad-level cell (QLC) mode, wherein each of the memory cells has 16 states.

The present disclosure also provides a memory device, which includes a memory array comprising memory cells; and a peripheral circuit coupled to the memory array. The peripheral circuit is configured to perform a first program operation to program the memory cells of the memory device to first programmed states, where each of the first programmed states corresponds to a group of target programmed states, and at least two groups have different numbers of the target programmed states. The peripheral circuit is also configured to perform a further program operation on a subset of the memory cells at a selected first programmed state, wherein the selected first programmed state corresponds to a selected target programmed state. The peripheral circuit is further configured to perform a second program operation to program the subset of the memory cells to the selected target programmed state, and to program remaining memory cells to remaining target programmed states according to the correspondence between each of the first programmed states and a respective group of the target programmed states.

In some implementations, the peripheral circuit is further configured to divide the target programmed states into different groups based on coupling offsets of the target programmed states during the programming.

In some implementations, the peripheral circuit is further configured to group adjacent target programmed states in a same group when the coupling offsets of the adjacent target programmed states are within a predetermined range.

In some implementations, the peripheral circuit is further configured to determine the coupling offsets of the target programmed states by measuring changes of threshold voltages of the memory cells coupled to a selected word line influenced by threshold voltages of memory cells coupled to an adjacent word line.

In some implementations, the peripheral circuit is further configured to select the selected target programmed state from the target programmed states, wherein the selected target programmed state has a higher threshold voltage than other target programmed states within a same group.

In some implementations, the peripheral circuit is further configured to select the selected target programmed state from the target programmed states, wherein the selected target programmed state has a higher threshold voltage than any target programmed state in another group.

In some implementations, the peripheral circuit is further configured to perform the first program operation during each of a first set of loops; and perform the second program operation during each of a second set of loops, wherein a program voltage is increased incrementally in each of the first set of loops and/or in each of the second set of loops.

In some implementations, the peripheral circuit is further configured to perform a first verification operation after the first program operation to verify whether each of the memory cells is at a respective first programmed state; and perform a second verification operation after the second program operation to verify whether each of the memory cells is at a respective second programmed state.

In some implementations, the peripheral circuit is further configured to program the memory cells in a quad-level cell (QLC) mode, wherein each of the memory cells has 16 states.

The present disclosure also provides a memory system, which includes a memory controller; and a memory device. The memory device includes a memory array comprising memory cells; and a peripheral circuit coupled to the memory array. The peripheral circuit is configured to perform a first program operation on the memory cells to be programmed such that each of the memory cells is programmed to a respective one of N different first programmed states, where N is a positive integer greater than 1 and less than M; and M is a total number of target programmed states of the memory cells. The peripheral circuit is also configured to perform a second program operation to program an i-th group of the memory cells at an i-th first programmed state to $K_i$ number of the target programmed states, where $K_i$ is greater than or equal to 1 and less than N; i is greater than or equal to 1, and less than or equal to N; and at least two first programmed states correspond to different k values.

The present disclosure further provides a memory system having a memory controller; and a memory device. The memory device includes a memory array comprising memory cells; and a peripheral circuit coupled to the memory array. The peripheral circuit is configured to perform a first program operation to program the memory cells of the memory device to first programmed states, wherein each of the first programmed states corresponds to a group of target programmed states, and at least two groups have different numbers of the target programmed states; perform a further program operation on a subset of the memory cells at a selected first programmed state, wherein the selected first programmed state corresponds to a selected target programmed state; and perform a second program operation to program the subset of the memory cells to the selected target programmed state, and to program remaining memory cells to remaining target programmed states according to the correspondence between each of the first programmed states and a respective group of the target programmed states.

The foregoing description of the specific implementations will so fully reveal the general nature of the present disclosure that others can, by applying knowledge within the skill of the art, readily modify and/or adapt, for various applications, such specific implementations, without undue experimentation, and without departing from the general concept of the present disclosure. Therefore, such adaptations and modifications are intended to be within the meaning and range of equivalents of the disclosed implementations, based on the disclosure and guidance presented herein. It is to be understood that the phraseology or terminology herein is for the purpose of description and not of limitation, such that the terminology or phraseology of the present specification is to be interpreted by the skilled artisan in light of the disclosure and guidance.

Implementations of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections can set forth one or more but not all exemplary implementations of the present disclosure as contemplated by the inventor(s), and thus, are not intended to limit the present disclosure and the appended claims in any way.

The breadth and scope of the present disclosure should not be limited by any of the above-described exemplary implementations, but should be defined only in accordance with the following claims and their equivalents.

What is claimed is:

1. A method for programming a memory device, comprising:
performing a first program operation on memory cells to be programmed such that each of the memory cells is programmed to a respective one of N different first programmed states, wherein:
N is a positive integer greater than 1 and less than M; and
M is a total number of target programmed states of the memory cells; performing a second program operation to program an i-th group of the memory cells at an i-th first programmed state to $K_i$ number of different target programmed states, wherein:
$K_i$ is greater than or equal to 1 and less than N;
i is greater than or equal to 1, and less than or equal to N; and
at least two first programmed states correspond to different $K_i$ values; and
grouping adjacent target programmed states in a same group when coupling offsets of the adjacent target programmed states are within a predetermined range.

2. The method of claim 1, further comprising:
dividing the target programmed states into N groups that correspond to the N different first programmed states based on the coupling offsets of the target programmed states during the programming, wherein an i-th group of the target programmed states has the $K_i$ number of the target programmed states.

3. The method of claim 2, wherein the performing of the first program operation comprises performing the first program operation according to the N groups of target programmed states, wherein each of the memory cells is programmed to the respective one of the N different first programmed states according to the N groups.

4. The method of claim 3, further comprising:
grouping a first group of adjacent target programmed states, whose coupling offsets are less than a first preset threshold value, into the first group;
grouping a second group of adjacent target programmed states, whose coupling offsets are greater than or equal to the first preset threshold value but less than a second preset threshold value, into the second group; and
grouping a third group of adjacent target programmed states, whose coupling offsets are greater than or equal to the second preset threshold value, into the third group.

5. The method of claim 2, further comprising:
determining the coupling offsets of the target programmed states by measuring changes of threshold voltages of memory cells coupled to a selected word line influenced by threshold voltages of memory cells coupled to an adjacent word line.

6. The method of claim 1, further comprising:
after performing the first program operation, performing a first verification operation to determine whether each of the memory cells is programmed to the respective one of N different first programmed states.

7. The method of claim 6, further comprising:
performing the first program operation on the memory cells during each of one or more loops;
after each of the one or more loops, determining whether to proceed to a next loop according to results of the first verification operation;
stopping the first program operation if the results show that the memory cells pass the first verification operation; and
proceeding to the next loop until each of the memory cells is programmed to the respective one of N different first programmed states.

8. The method of claim 6, further comprising:
verifying the N different first programmed states using N different first verification voltages.

9. The method of claim 6, further comprising:
after performing the second program operation, performing a second verification operation to determine whether each of the memory cells is programmed to a respective target programmed state, wherein different second verification voltages are used to verify the $K_i$ number of different target programmed states.

10. The method of claim 9, wherein an i-th first verification voltage used to verify the i-th first programmed state is smaller than any of the second verification voltages used to verify the $K_i$ number of target programmed states in the i-th group.

11. A memory device, comprising:
a memory array comprising memory cells; and
a peripheral circuit coupled to the memory array and configured to:
perform a first program operation on the memory cells to be programmed such that each of the memory cells is programmed to a respective one of N different first programmed states, wherein:
N is a positive integer greater than 1 and less than M; and
M is a total number of target programmed states of the memory cells;
perform a second program operation to program an i-th group of the memory cells at an i-th first programmed state to $K_i$ number of the target programmed states, wherein:
$K_i$ is greater than or equal to 1 and less than N;
i is greater than or equal to 1, and less than or equal to N; and
at least two first programmed states correspond to different $K_i$ values; and
group adjacent target programmed states in a same group when coupling offsets of the adjacent target programmed states are within a predetermined range.

12. The memory device of claim 11, wherein the peripheral circuit is further configured to:
divide the target programmed states into N groups that correspond to the N different first programmed states based on the coupling offsets of the target programmed states during the programming, wherein an i-th group of the target programmed states has the $K_i$ number of the target programmed states.

13. The memory device of claim 12, wherein the performing of the first program operation comprises performing the first program operation according to the N groups of target programmed states, wherein each of the memory cells is programmed to the respective one of the N different first programmed states according to the N groups.

14. The memory device of claim 13, wherein the peripheral circuit is further configured to:
group a first group of adjacent target programmed states, whose coupling offsets are less than a first preset threshold value, into the first group;
group a second group of adjacent target programmed states, whose coupling offsets are greater than or equal to the first preset threshold value but less than a second preset threshold value, into the second group; and group a third group of adjacent target programmed states, whose coupling offsets are greater than or equal to the second preset threshold value, into the third group.

15. The memory device of claim 12, wherein the peripheral circuit is further configured to:
determine the coupling offsets of the target programmed states by measuring changes of threshold voltages of memory cells coupled to a selected word line influenced by threshold voltages of memory cells coupled to an adjacent word line.

16. The memory device of claim 11, wherein the peripheral circuit is further configured to:
after performing the first program operation, perform a first verification operation to determine whether each of the memory cells is programmed to the respective one of N different first programmed states.

17. The memory device of claim 16, wherein the peripheral circuit is further configured to:
perform the first program operation on the memory cells during each of one or more loops;
after each of the one or more loops, determine whether to proceed to a next loop according to results of the first verification operation;
stop the first program operation if the results show that the memory cells pass the first verification operation; and
proceed to the next loop until each of the memory cells is programmed to the respective one of N different first programmed states.

18. The memory device of claim 16, wherein the peripheral circuit is further configured to:
verify the N different first programmed states using N different first verification voltages.

19. The memory device of claim 16, wherein the peripheral circuit is further configured to:
after performing the second program operation, perform a second verification operation to determine whether each of the memory cells is programmed to a respective target programmed state, wherein different second verification voltages are used to verify the $K_j$ number of different target programmed states.

20. The memory device of claim 19, wherein an i-th first verification voltage used to verify the i-th first programmed state is smaller than any of the second verification voltages used to verify the $K_j$ number of target programmed states in the i-th group.

* * * * *